US012488586B2

(12) United States Patent
Arakawa et al.

(10) Patent No.: US 12,488,586 B2
(45) Date of Patent: Dec. 2, 2025

(54) ROW DETECTION SYSTEM AND AGRICULTURAL MACHINE

(71) Applicant: Kubota Corporation, Osaka (JP)

(72) Inventors: Yuma Arakawa, Sakai (JP); Mitsuaki Nagao, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 26 days.

(21) Appl. No.: 18/744,798

(22) Filed: Jun. 17, 2024

(65) Prior Publication Data
US 2024/0428583 A1 Dec. 26, 2024

(30) Foreign Application Priority Data

Jun. 23, 2023 (JP) ................. 2023-103206

(51) Int. Cl.
G06V 20/10 (2022.01)
A01B 69/00 (2006.01)
(Continued)

(52) U.S. Cl.
CPC .......... *G06V 20/188* (2022.01); *A01B 69/001* (2013.01); *A01B 69/008* (2013.01);
(Continued)

(58) Field of Classification Search
CPC ...... G06V 20/188; G06V 10/25; G06V 10/28; G06V 10/44; G06V 10/56; G06V 10/764;
(Continued)

(56) References Cited

U.S. PATENT DOCUMENTS

2018/0160619 A1\* 6/2018 Manji ................. A01D 34/008
2019/0000007 A1\* 1/2019 Schleicher ............ B62D 6/005
(Continued)

FOREIGN PATENT DOCUMENTS

EP 4 335 266 A1 3/2024
JP 2624390 B2 6/1997
(Continued)

OTHER PUBLICATIONS

Machine Translation of JP 2020150869 A PDF File Name: "JP2020150869A_Machine_Translation.pdf" (Year: 2020).\*
(Continued)

*Primary Examiner* — Lindsay M Low
*Assistant Examiner* — Ruben Picon-Feliciano
(74) *Attorney, Agent, or Firm* — Keating & Bennett, LLP

(57) ABSTRACT

A row detection system includes first and second imaging devices to be mounted on an agricultural machine, and a processor configured or programmed to perform image processing for first and second images which are generated by the first and second imaging devices, respectively. The second imaging device is located so that at least a portion of each front wheel and at least a portion of each rear wheel are included in the second image. The processor is configured or programmed to convert the first image into a first plan view image, convert the second image into a second plan view image, select a region of interest from the first plan view image based on a position of each front wheel and a position of each rear wheel in the second plan view image, and perform a row detection process targeted at the region of interest.

16 Claims, 24 Drawing Sheets

(51) Int. Cl.

| | |
|---|---|
| *A01B 69/04* | (2006.01) |
| *G06T 7/70* | (2017.01) |
| *G06V 10/25* | (2022.01) |
| *G06V 10/28* | (2022.01) |
| *G06V 10/44* | (2022.01) |
| *G06V 10/56* | (2022.01) |
| *G06V 10/764* | (2022.01) |
| *G06V 20/56* | (2022.01) |
| *H04N 23/90* | (2023.01) |

(52) U.S. Cl.
CPC ............... *G06T 7/70* (2017.01); *G06V 10/25* (2022.01); *G06V 10/28* (2022.01); *G06V 10/44* (2022.01); *G06V 10/56* (2022.01); *G06V 10/764* (2022.01); *G06V 20/56* (2022.01); *G06T 2207/30188* (2013.01); *G06T 2207/30252* (2013.01); *H04N 23/90* (2023.01)

(58) Field of Classification Search
CPC .... G06V 20/56; A01B 69/001; A01B 69/008; G06T 7/70; G06T 2207/30188; G06T 2207/30252; G06T 2207/10024; H04N 23/90
See application file for complete search history.

(56) References Cited

U.S. PATENT DOCUMENTS

2020/0334859 A1* 10/2020 Sneyders ................. G06T 7/80
2023/0060628 A1* 3/2023 Schleicher ........... A01D 41/127
2024/0052602 A1* 2/2024 Matsumoto ............. H04N 7/18

FOREIGN PATENT DOCUMENTS

| JP | 2016-146061 A | | 8/2016 |
| JP | 2016-208871 A | | 12/2016 |
| JP | 2020150869 A | * | 9/2020 |
| JP | 2021-7310 A | | 1/2021 |
| JP | 2021007310 A | * | 1/2021 |
| WO | 2023/276227 A1 | | 1/2023 |

OTHER PUBLICATIONS

Machine Translation of JP 2021007310 A PDF File Name: "JP2021007310A_Machine_Translation.pdf" (Year: 2021).*
Gonzalo et al., "Machine-Vision Systems Selection for Agricultural Vehicles a Guide", Published on Nov. 22, 2016, Journal of Imaging, Issue 2, vol. 34, pp. 1-31. (Year: 2016).*
Bjorn et al., "A vision based row-following system for agricultural field machinery", Published on Mar. 2025, ScienceDirect, vol. 15, Issue 2, pp. 251-269. (Year: 2005).*

* cited by examiner

ROW DETECTION SYSTEM AND AGRICULTURAL MACHINE

CROSS REFERENCE TO RELATED APPLICATIONS

This application claims the benefit of priority to Japanese Patent Application No. 2023-103206 filed on Jun. 23, 2023. The entire contents of each application are hereby incorporated herein by reference.

BACKGROUND OF THE INVENTION

1. Field of the Invention

The present disclosure relates to row detection systems and agricultural machines including row detection systems.

2. Description of the Related Art

Research and development has been directed to the automation of work vehicles, such as tractors, to be used in fields. For example, work vehicles have been put to practical use which travel via automatic steering by utilizing a positioning system capable of precise positioning, e.g., GNSS (Global Navigation Satellite System). Work vehicles that automatically perform speed control as well as automatic steering have also been put to practical use.

Moreover, vision guidance systems are being developed which detect rows of crops (crop rows) or ridges in a field by using an imaging device such as a camera, and control the travel of a work vehicle along the detected crop rows or ridges.

Japanese Laid-Open Patent Publication No. 2016-208871 discloses a work machine that travels along a ridge in cultivated land where crops are planted in ridges which are formed in rows. Japanese Laid-Open Patent Publication No. 2016-208871 describes binarizing a raw image acquired by capturing cultivated land from obliquely above with an onboard camera, and thereafter generating a planar perspective projection image. In the technique disclosed in Japanese Laid-Open Patent Publication No. 2016-208871, a planar projective transformation image is rotated to generate a number of rotated images in different orientations, and work paths between ridges are detected.

SUMMARY OF THE INVENTION

When an agricultural machine utilizes an image recognition technique in order to move along a row region such as a crop row or ridge via automatic steering, it is necessary to detect the row region with high positional accuracy.

Example embodiments of the present disclosure provide row detection systems that can improve the detection accuracy of row regions, and agricultural machines including the row detection systems.

A row detection system according to an example embodiment of the present disclosure includes a first imaging device to be mounted on an agricultural machine including a plurality of wheels including a pair of front wheels and a pair of rear wheels, the first imaging device being operable to image a ground surface and generate a first image concerning a first region of the ground surface, a second imaging device to be mounted on the agricultural machine and operable to image the ground surface and generate a second image concerning a second region of the ground surface, the second region being shifted rearward from the first region, and a processor configured or programmed to perform image processing for the first image and the second image, wherein the second imaging device is located so that at least a portion of each front wheel and at least a portion of each rear wheel are included in the second image, and the processor is configured or programmed to convert the first image into a first plan view image as viewed from above the ground surface, convert the second image into a second plan view image as viewed from above the ground surface, and select a region of interest from the first plan view image based on a position of each front wheel and a position of each rear wheel in the second plan view image, and perform a row detection process targeted at the region of interest.

An agricultural machine according to another example embodiment of the present disclosure is an agricultural machine including the above row detection system, and an automatic steering device to control a traveling direction of the agricultural machine based on a position of a crop row or ridge detected by the row detection system.

General or specific aspects of various example embodiments of the present disclosure may be implemented using a device, a system, a method, an integrated circuit, a computer program, a non-transitory computer-readable storage medium, or any combination thereof. The computer-readable storage medium may be inclusive of a volatile storage medium, or a non-volatile storage medium. The device may include a plurality of devices. In the case where the device includes two or more devices, the two or more devices may be disposed within a single apparatus, or divided over two or more separate apparatuses.

According to example embodiments of the present disclosure, the detection accuracy of row regions such as crop rows or ridges can be improved.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
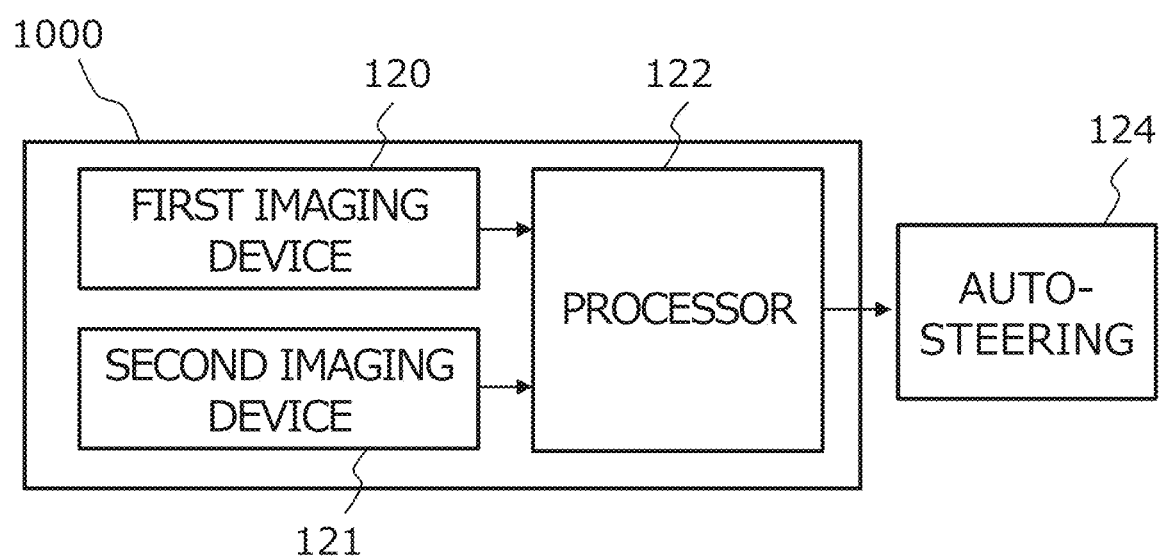
FIG. 1 is a block diagram showing the configuration of a row detection system according to an illustrative example embodiment of the present disclosure.

Hereinafter, example embodiments of the present disclosure will be described more specifically. Note however that unnecessarily detailed descriptions may be omitted. For example, detailed descriptions on what is well known in the art or redundant descriptions on what is substantially the same configuration may be omitted. This is to avoid lengthy description, and facilitate the understanding of those skilled in the art. The accompanying drawings and the following description, which are provided by the present inventors so that those skilled in the art can sufficiently understand the present disclosure, are not intended to limit the scope of claims. In the following description, component elements having identical or similar functions are denoted by identical reference numerals.

The following example embodiments are only exemplary, and the techniques according to the present disclosure is not limited to the following example embodiments. For example, numerical values, shapes, materials, steps, and orders of steps, layout of a display screen, etc., that are indicated in the following example embodiments are only exemplary, and admit of various modifications so long as it makes technological sense. Any one implementation may be combined with another so long as it makes technological sense to do so.

As used in the present disclosure, an "agricultural machine" broadly includes any machine that performs basic tasks of agriculture, e.g., "tilling", "planting", "harvesting", and "spraying chemical agents" in fields. An agricultural machine is a machine that has a functionality and structure to perform agricultural operations such as tilling, seeding, preventive pest control, manure spreading, planting of crops, or harvesting for the ground surface within a field. Such agricultural work, tasks, or operations may be referred to as "groundwork", or simply as "work", "tasks", or "operations". Not only does a work vehicle, such as a tractor, function as an "agricultural machine" by itself alone, but an implement that is attached to or towed by a work vehicle and the work vehicle may as a whole function as one "agricultural machine". Examples of agricultural machines include tractors, vehicles for crop management, vegetable transplanters, mowers, and field-moving robots.

A row detection system according to an example embodiment of the present disclosure includes a plurality of imaging devices to be mounted to an agricultural machine including a plurality of wheels including a pair of front wheels and a pair of rear wheels. The plurality of imaging devices include a first imaging device to image the ground surface and generate a first image concerning a first region of the ground surface, and a second imaging device to image the ground surface and generate a second image concerning a second region of the ground surface, the second region being shifted rearward from the first region. The processor is configured or programmed to select a region of interest from the first image by processing the first image and the second image. The processor is configured or programmed to perform a row detection process targeted at the region of interest. With a row detection system according to an example embodiment of the present disclosure, because a region of interest is selected based on the position of each front wheel and the position of each rear wheel, a row detection process can be efficiently performed, thereby reducing the calculation load.

The processor may be configured or programmed to determine a target path based on the detected row region, and output information of the target path to an automatic steering device of the agricultural machine. The automatic steering device performs steering control for the agricultural machine so that the agricultural machine moves along the target path. As a result, the agricultural machine can be caused to move along a crop row or ridge.

FIG. 1 is a block diagram showing the configuration of a row detection system 1000 according to an illustrative example embodiment of the present disclosure. The row detection system 1000 includes a first imaging device 120, a second imaging device 121, and a processor 122. Specifically, the first imaging device 120 is to be mounted on an agricultural machine, and images the ground surface to generate a first image concerning a first region of the ground surface. The second imaging device 121 is to be mounted on the agricultural machine, and images the ground surface to generate a second image concerning a second region of the ground surface that is shifted rearward from the first region. The agricultural machine includes a plurality of wheels including a pair of front wheels and a pair of rear wheels. The second imaging device 121 is located so that at least a portion of each front wheel and at least a portion of each rear wheel are included in the second image. The first imaging device 120 and the second imaging device 121 may be located at the bottom of the agricultural machine 100. Alternatively, the first imaging device 120 may be located at the front end or an upper portion of the agricultural machine 100, and the second imaging device 121 may be located at a central portion or a rear portion of the bottom of the agricultural machine 100. In such a configuration, the agricultural machine 100 may be configured to travel astride a crop row 12 (see FIG. 11).

The processor 122 may be connected to an automatic steering device 124 that is included in the agricultural machine 100, for example. The processor 122 is configured or programmed to convert the first image into a first plan view image as viewed from above the ground surface, and convert the second image into a second plan view image as viewed from above the ground surface. The processor 122 is configured or programmed to then select a region of interest from the first plan view image based on the position of each front wheel and the position of each rear wheel in the second plan view image, and perform a row detection process targeted at the region of interest. Note that the processor 122 may be configured or programmed to generate a composite image, such as a panoramic planar image, by merging the first plan view image and the second plan view image.

Figure 2:
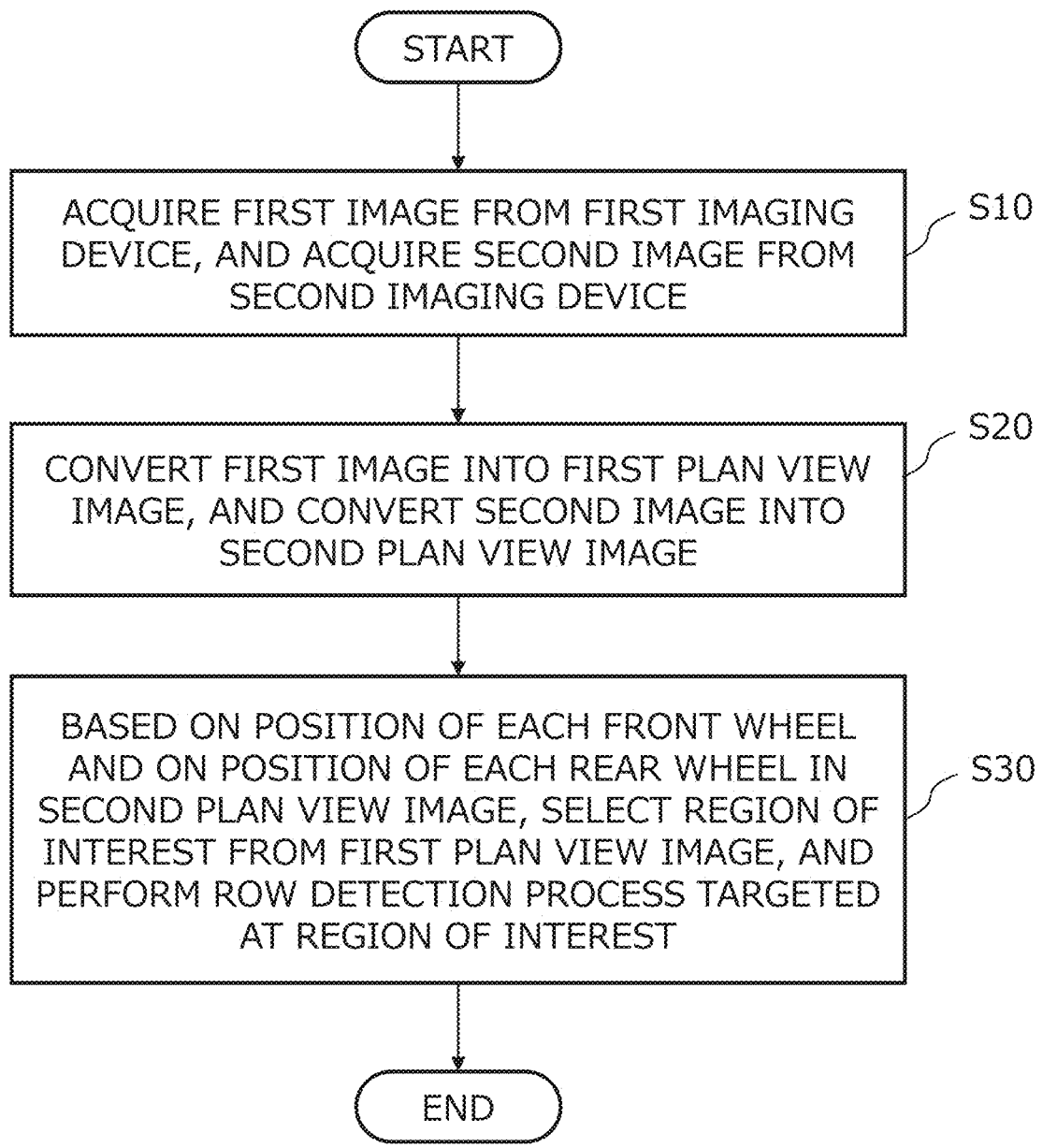
FIG. 2 is a flowchart showing an overview of operations performed by a processor.

FIG. 2 is a flowchart showing an overview of operations performed by the processor 122. By performing operations at steps S10, S20 and S30 shown in FIG. 2, the processor 122 detects a crop row or ridge on the ground surface.

At step S10, the processor 122 is configured or programmed to acquire a first image from the first imaging device 120 and acquires a second image from the second imaging device 121. At step S20, the processor 122 is configured or programmed to convert the first image into a first plan view image as viewed from above the ground surface, and convert the second image into a second plan view image as viewed from above the ground surface. These conversions are performed through a homography transformation (planar perspective projection) described below. At step S30, based on the position of each front wheel and the position of each rear wheel in the second plan view image, the processor 122 is configured or programmed to select a region of interest from the first plan view image, and perform a row detection process targeted at the region of interest.

Next, details of the above process to be performed at step S30 will be described.

Figure 3A:
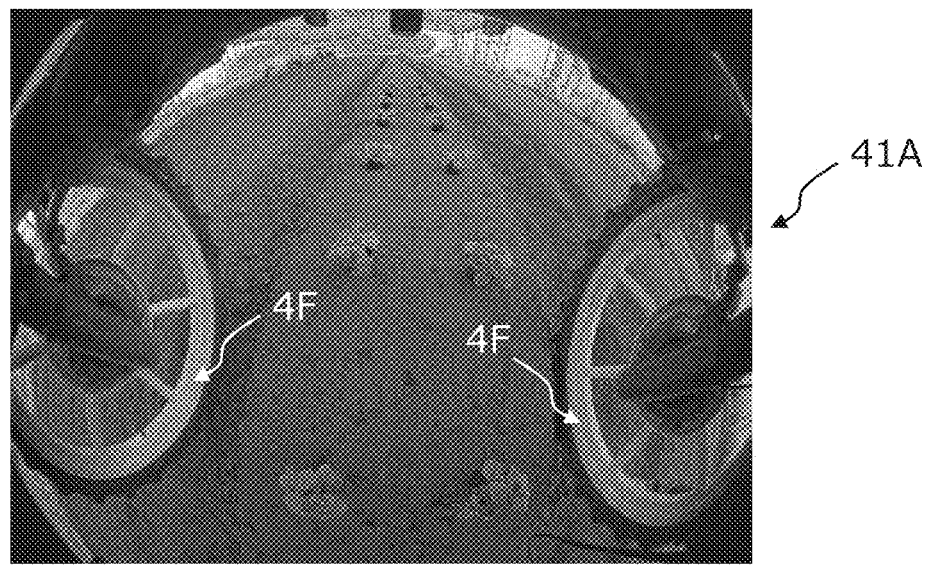
FIG. 3A is a diagram showing an example of a first image acquired by a first imaging device mounted to an agricultural machine.
Figure 3B:
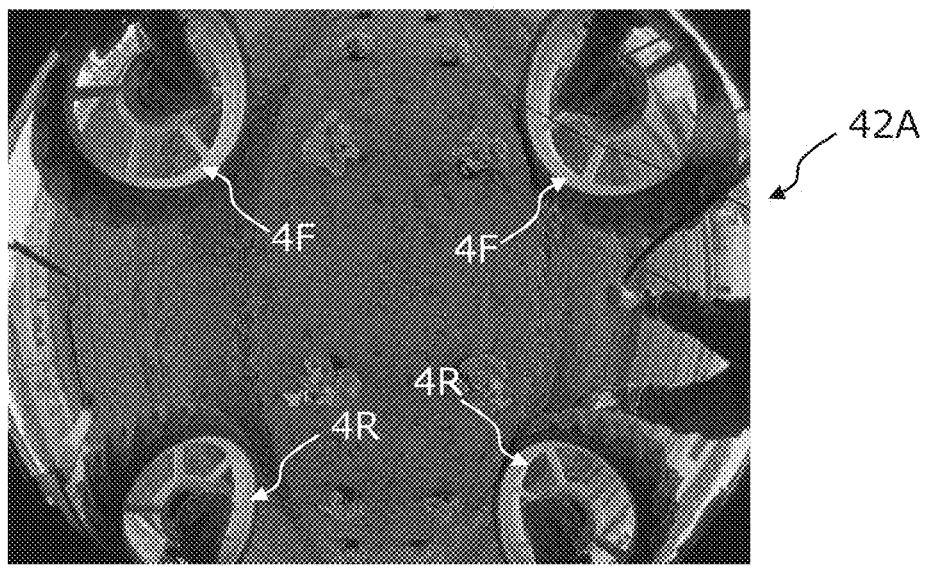
FIG. 3B is a diagram showing an example of a second image acquired by a second imaging device mounted to an agricultural machine.

FIG. 3A is a diagram showing an example of a first image 41A acquired from the first imaging device 120, and FIG. 3B is a diagram showing an example of a second image 42A acquired from the second imaging device 121. The first image 41A includes at least a portion of each front wheel 4F. The second image 42A includes at least a portion of each front wheel 4F and at least a portion of each rear wheel 4R. In other words, the second image 42A includes at least a portion of each of the four wheels 4F and 4R. The first image 41A and the second image 42A are each acquired at step S10 in FIG. 2.

Figure 4A:
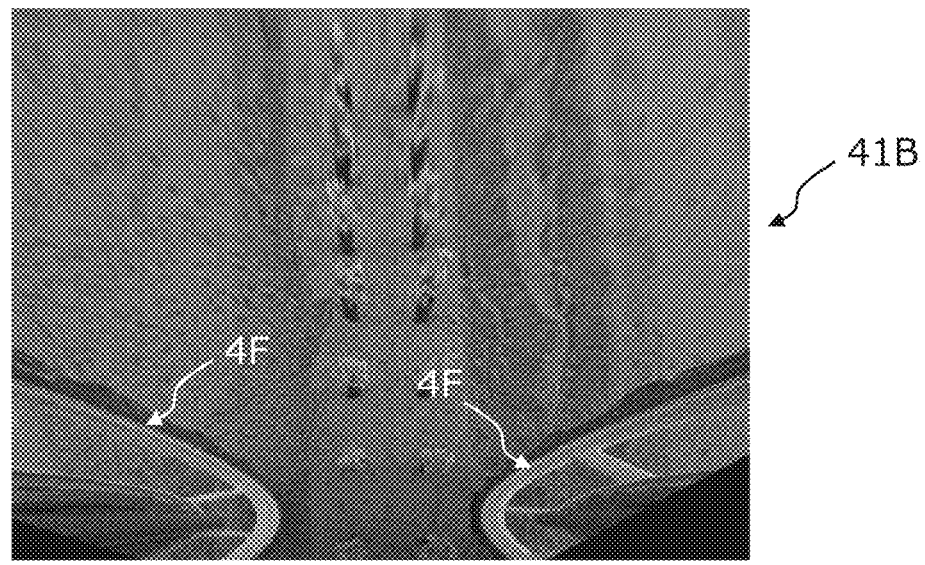
FIG. 4A is a diagram showing an example of a first plan view image as viewed from above the ground surface, which is generated through conversion from the first image.
Figure 4B:
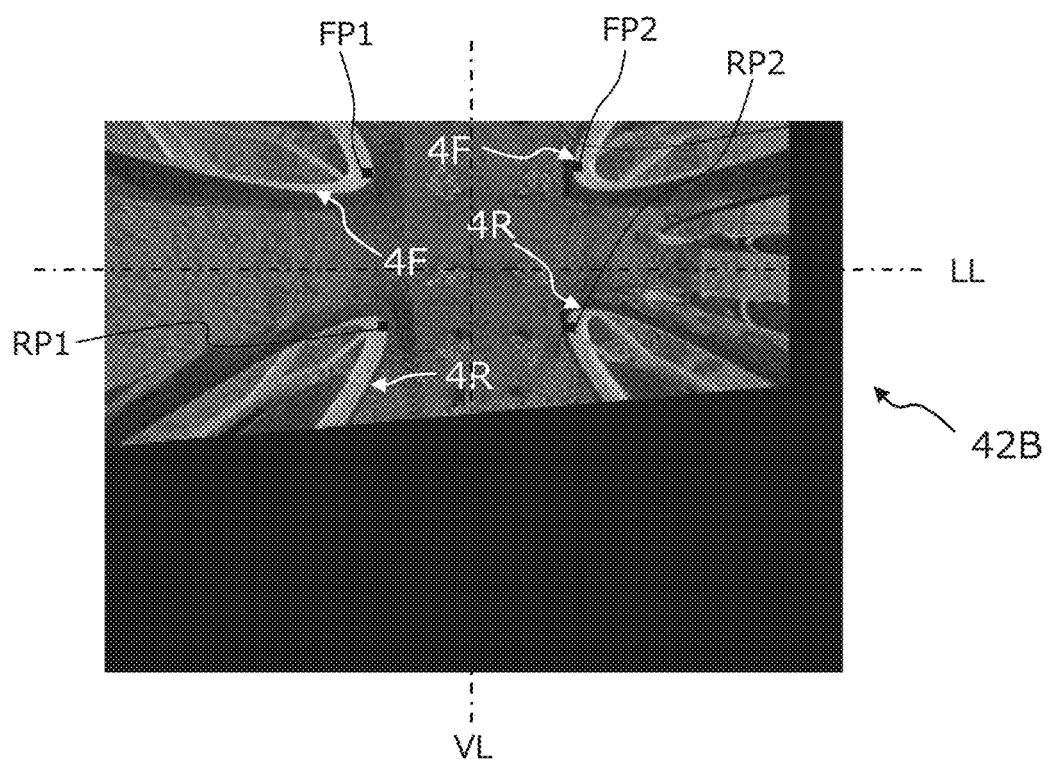
FIG. 4B is a diagram showing an example of a second plan view image as viewed from above the ground surface, which is generated through conversion from the second image.

FIG. 4A is a diagram showing an example of a first plan view image 41B, and FIG. 4B is a diagram showing an example of a second plan view image 42B. The first plan view image 41B and the second plan view image 42B are each generated at step S20 in FIG. 2.

The processor 122 in the present disclosure is configured or programmed to detect regions corresponding to the pair of front wheels 4F and regions corresponding to the pair of rear wheels 4R in the second plan view image 42B. Hereinafter, for simplicity, the "regions corresponding to the pair of front wheels 4F" may be referred to the "front wheel regions 4F", whereas the "regions corresponding to the pair of rear wheels 4R" may be referred to as the "rear wheel regions 4R".

In the example shown in FIG. 4B, the front wheels 4F and the rear wheels 4R are each composed of a rim that retains a black rubber tire. The rim is made of a metal material with a painted surface, for example, and has a (e.g., white) surface that is higher in lightness than the ground surface and the tire surface. Therefore, by selecting pixels having a relatively high lightness from the second plan view image 42B, it is possible to detect the front wheel regions 4F and the rear wheel regions 4R in the second plan view image 42B. Pixels having a relatively high lightness define images having a lightness above a predetermined value. This predetermined value may be prefixed, or automatically determined based on a lightness distribution of the pixels in the second plan view image 42B. From an aggregation of pixels having a relatively high lightness, regions of high lightness can be determined.

In a case where the first image 41A and the second image 42A are color images, the processor 122 may determine the front wheel regions 4F and the rear wheel regions 4R in the second plan view image 42B based on color information of the pair of front wheels 4F and the pair of rear wheels 4F. For example, if the color of the rim surfaces of the pair of front wheels 4F and the pair of rear wheels 4F is yellow, then yellow pixels may be selected from the second plan view image 42B being a color image, whereby the front wheel regions 4F and the rear wheel regions 4R can be detected in the second plan view image 42B. Instead of the rims of the pair of front wheels 4F and the pair of rear wheels 4F, color information of the tire surfaces may be relied on in detecting the front wheel regions 4F and the rear wheel regions 4R in the second plan view image 42B. However, the tire surface generally has a black color, and is often caked with dirt or mud, which may not enable easy discrimination against the ground surface. Therefore, a detection process based on the lightness or color of the rims will contribute to an accurate determination of the front wheel regions 4F and the rear wheel regions 4R.

The processor 122 can extract a pair of front-wheel reference points FP1 and FP2 from the front wheel regions 4F, and extract a pair of rear-wheel reference points RP1 and RP2 from the rear wheel regions 4R. In FIG. 4B, these front-wheel reference points FP1 and FP2 and rear-wheel reference points RP1 and RP2 are schematically represented as dark squares. Among the pixels composing the front wheel regions 4F, the front-wheel reference points FP1 and FP2 are the pixels that define an interval between the left front wheel region 4F and the right front wheel region 4F. Among the pixels composing the rear wheel regions 4R, the rear-wheel reference points RP1 and RP2 are the pixels that define an interval between the left rear wheel region 4R and the right rear wheel region 4R. The front-wheel reference points FP1 and FP2 are selected as representative points that define the interval between the pair of front wheels 4F. The rear-wheel reference points RP1 and RP2 are selected as representative points that define the interval between the pair of rear wheels 4R. As will be described later, the region of interest is preferably determined as a region that includes, in its center, a region interposed between the right and left wheels of the agricultural machine. By selecting such a region of interest and performing image processing for the selected region of interest, it becomes possible to efficiently detect a crop row or ridge existing on a target path for the agricultural machine.

The specific process of extracting the pair of front-wheel reference points FP1 and FP2 from the front wheel regions 4F and extracting the pair of rear-wheel reference points RP1 and RP2 from the rear wheel regions 4R may be performed as follows, for example.

First, the processor 122 determines a vertical reference line VL that divides the second plan view image 42B into a left portion and a right portion, as shown in FIG. 4B. From the front wheel regions 4F, the processor 122 selects a pair of pixels that are the closest to the vertical reference line VL as the pair of front-wheel reference points FP1 and FP2, and from the rear wheel regions 4R, the processor 122 selects a pair of pixels that are the closest to the vertical reference line VL as the pair of rear-wheel reference points RP1 and RP2. Moreover, the processor 122 determines a horizontal reference line LL that is orthogonal to the vertical reference line VL. Above the horizontal reference line LL are the front wheel regions; below the horizontal reference line LL are the rear wheel regions. Thus, because the processor 122 divides each of the left portion and the right portion of the second plan view image 42B into an upper portion and a lower portion, it is possible to extract four reference points (FP1, FP2, RP1, RP2) from four portions of a single plan view image 42B.

Note that the width of the region of interest may include the pair of front-wheel reference points FP1 and FP2, include the pair of rear-wheel reference points RP1 and RP2, or include the pair of front-wheel reference points FP1 and FP2 and the pair of rear-wheel reference points RP1 and RP2. In the present disclosure, the "region of interest" may be a rectangular region having a predetermined width and extending along the vertical direction in the center of the first plan view image 41B, for example. The region of interest may have a variety of shapes, e.g., a trapezoid or a sector of a circle. Hereinafter, a method of determining the predetermined width will be described with respect to a case where the region of interest is a rectangle having a predetermined width.

The method of determining the positions of pixels defining the aforementioned four reference points (FP1, FP2, RP1, RP2) may be arbitrary. In an example embodiment of the present disclosure, in order to extract the four reference points (FP1, FP2, RP1, RP2) from the rims of the front wheels 4F and the rear wheels 4R, lightness and edge information of plan view images is used.

Figure 5:
FIG. 5 is a diagram showing regions of a pair of front wheels and regions of a pair of rear wheels that are detected from the second plan view image.
Figure 6:
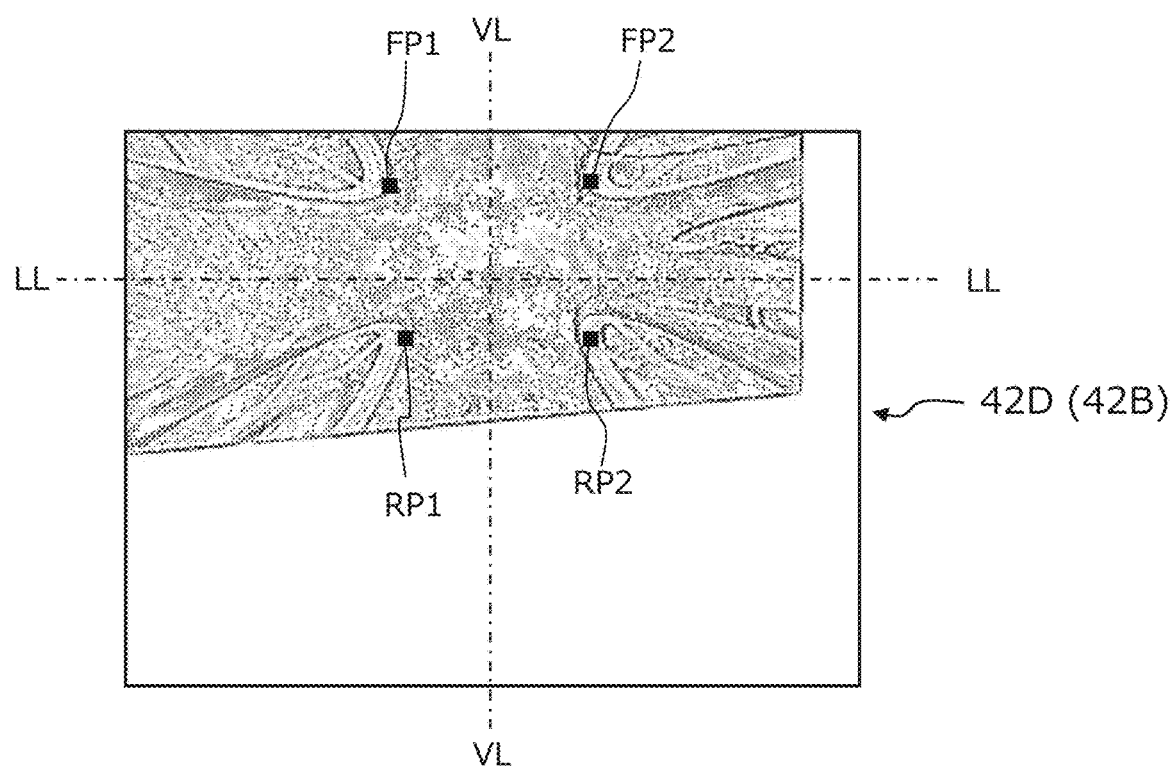
FIG. 6 is a diagram showing an example image of edges detected from the second plan view image.

FIG. 5 is an image in which, out of the second plan view image 42B in FIG. 4B, regions of high lightness are shown white. In the image of FIG. 5, white regions correspond to the front wheel regions 4F and the rear wheel regions 4R. In order to identify a plurality of pixels defining the outlines of the front wheel regions 4F and the rear wheel regions 4R, the processor 122 generates an edge image indicating edges in the second plan view image 42B, by using an edge detection technique. FIG. 6 is a diagram showing an example of an edge image 42D that is generated in this manner.

The processor 122 determines overlapping portions between the edges and the front wheel regions 4F and rear wheel regions 4R in the second plan view image 42B. Specifically, the processor 122 determines a plurality of pixels (candidate reference pixels) existing in the white regions in FIG. 5, that is, overlapping positions between the edges depicted in FIG. 6 and the front wheel regions 4F and rear wheel regions 4R. Next, the processor 122 selects from the front wheel regions 4F a pair of pixels that are the closest to the vertical reference line VL as the pair of front-wheel reference points FP1 and FP2, and selects from the rear wheel regions 4R a pair of pixels that are the closest to the vertical reference line VL as the pair of rear-wheel reference points RP1 and RP2. FIG. 6 schematically illustrates the front-wheel reference points FP1 and FP2 and the rear-wheel reference points RP1 and RP2 as dark squares.

Figure 7:
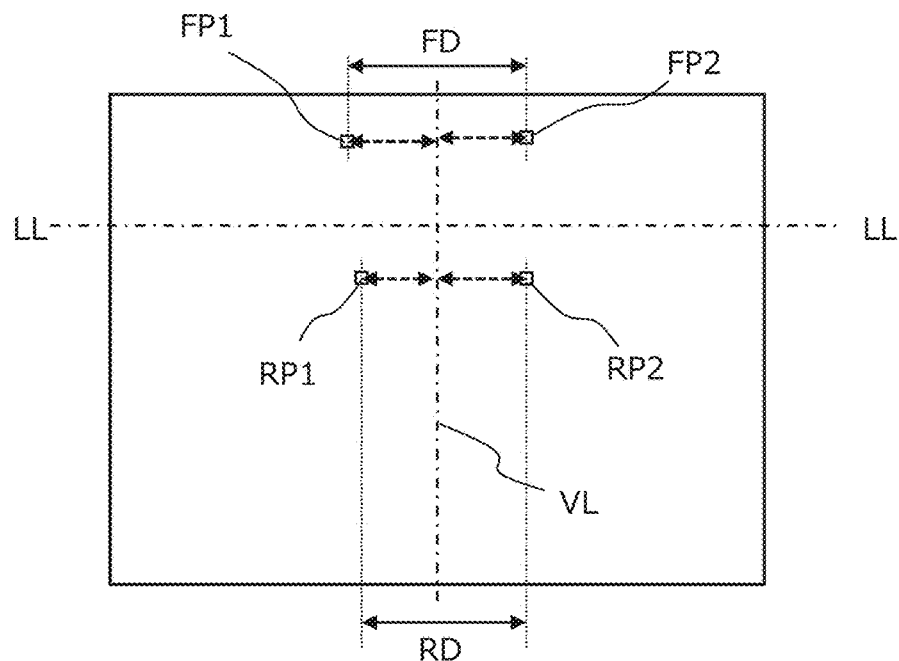
FIG. 7 is a diagram showing an example arrangement of front-wheel reference points and rear-wheel reference points obtained from the second plan view image.

FIG. 7 is a diagram showing a front wheel interval FD defined by the distance between the front-wheel reference point FP1, which is located to the left, and the front-wheel reference point FP2, which is located to the right, and a rear wheel interval RD defined by the distance between the rear-wheel reference point RP1, which is located to the left, and the rear-wheel reference point RP2, which is located to the right.

The processor 122 may determine the width of the region of interest based on one of the front wheel interval FD and the rear wheel interval RD. For example, the width of the region of interest may be determined based on an interval that is not the smaller one of the front wheel interval FD and the rear wheel interval RD. In that case, as the width of the region of interest, the processor 122 may use a value obtained by multiplying one of the front wheel interval FD and the rear wheel interval RD with a numerical value of not less than about 0.9 and not more than about 2.0, for example.

Figure 8:
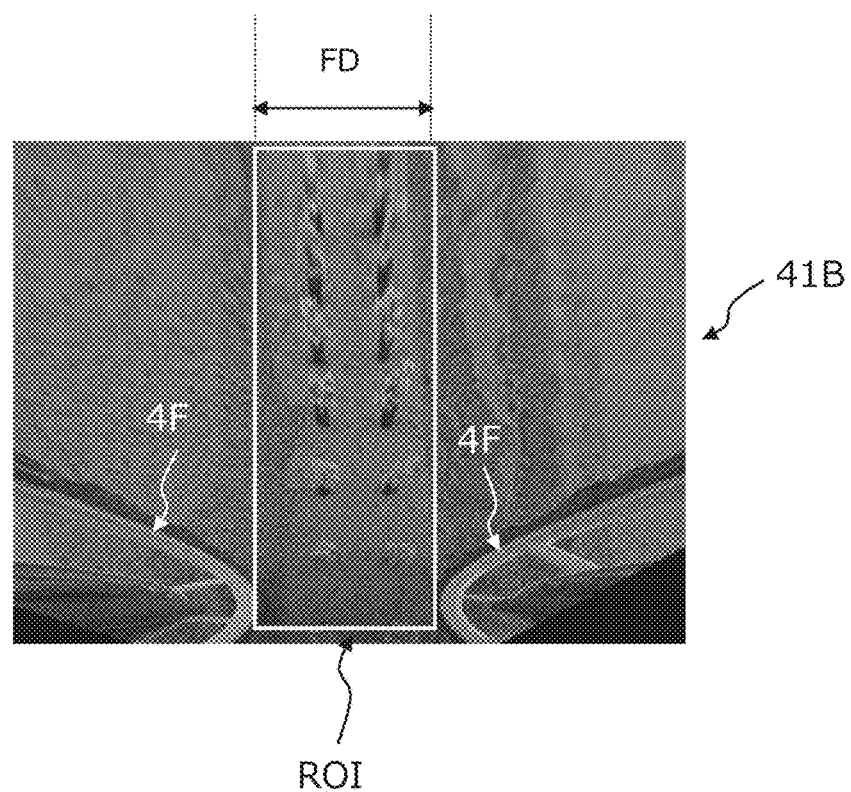
FIG. 8 is a diagram showing an example of a region of interest in the first plan view image.

FIG. 8 is a diagram showing an example of a region of interest ROI in the first plan view image 41B. The width of the region of interest ROI is set to about 1.0 times the front wheel interval FD, for example. Note that the region of interest ROI having been selected from the first plan view image 41B may be set onto the first image 41A in FIG. 3A through a coordinate transform. This coordinate transform is an inverse transformation of the transformation for generating the first plan view image 41B from the first image 41A.

In the example of FIG. 8, the region of interest ROI has a rectangular shape having longer sides on its right and left that extend in parallel to the traveling direction of the agricultural machine. The length of a shorter side of this rectangle corresponds to the width of the region of interest ROI. The position of the region of interest ROI may be set so that a straight line connecting midpoints of the pair of shorter sides passes through the center (e.g., the centroid) of the agricultural machine in a plan view. Note that the left longer side of the region of interest ROI may be chosen so as to pass through the front-wheel reference point FP1 or the rear-wheel reference point RP1, and the right longer side of the region of interest ROI may be chosen so as to pass through the front-wheel reference point FP2 or the rear-wheel reference point RP2. The width and position of the region of interest ROI are not limited to the example shown in FIG. 8. As mentioned earlier, the width of the region of interest ROI may have a value obtained by multiplying one of the front wheel interval FD and the rear wheel interval RD with a numerical value of not less than about 0.9 and not more than about 2.0, for example.

In the example of FIG. 8, the length of a longer side of the region of interest ROI along the traveling direction of the agricultural machine is smaller than the size (length) of the first plan view image 41B along the traveling direction; however, the length of a longer side of the region of interest ROI is not limited to this example. In a case where the first image includes an image of the ground surface extending ahead in the traveling direction as shown in FIG. 3A, the region of interest ROI may extend, e.g., about 2 meters or more ahead of the front end of the agricultural machine.

Examples of the agricultural machine 100 on which the row detection system according to an example embodiment of the present disclosure is to be mounted include work vehicles such as tractors and vehicles for crop management. The agricultural machine 100 is configured to travel along a crop row 12, and perform agricultural work such as crop planting, seeding, manure spreading, pest control, harvest, or tilling. The agricultural machine 100 can detect the crop row 12 and travel along the crop row 12 via automatic steering.

The first imaging device 120 is mounted at a first position on the agricultural machine 100. The second imaging device 121 is mounted at a second position on the agricultural machine 100 which is rearward of the first position. For example, the first imaging device 120 is mounted at a side that is frontward of the centroid of the agricultural machine 100, and the second imaging device 121 is mounted at a side that is rearward of the centroid of the agricultural machine 100. The agricultural machine 100 is configured to travel, in a field in which the crop row 12 exists, along the crop row 12 via automatic steering. Note that the position and orientation of the first imaging device 120 and the second imaging device 121 are not limited to the illustrated example. The first imaging device 120 may be provided at the front end of the agricultural machine 100, and the second imaging device 121 may be provided at the rear end of the agricultural machine 100 or an implement.

Based on the first plan view image, or on the first plan view image and the second plan view image, the processor 122 detects the crop row 12. For example, when the first image and the second image are color images, the processor 122 generates an enhanced image in which the color (e.g., green) of the crop row is enhanced, based on the first image and the second image. Then, based on the enhanced image, the processor 122 can detect the crop row 12 on the ground surface. More detailed examples of the method of detecting the crop row 12 will be described later.

After detecting the crop row 12, the processor 122 determines an approximation line (a straight line or a curve) of the crop row 12, and determines a target path for the agricultural machine 100 along the approximation line. The processor 122 outputs information of the determined target path to the automatic steering device 124 of the agricultural machine 100. The automatic steering device 124 performs steering control for the agricultural machine 100 so that the agricultural machine 100 travels along the target path. As a result, the agricultural machine 100 can be caused to travel along the crop row 12.

Thus, in the present example embodiment, a crop row 12 is detected from a region of interest having a predetermined width, based on a first plan view image generated by the first imaging device 120 and a second plan view image generated by the second imaging device 121. As in the example illustrated above, the crop row 12 may be detected based on a panoramic composite image obtained by merging the first plan view image and the second plan view image. The panoramic composite image includes information across a broader area than each of the first plan view image and the second plan view image alone. Therefore, the approximation line of the crop row 12 can be determined more accurately than in the case of detecting the crop row 12 based only on one of the first plan view image and the second plan view image alone. In particular, when detecting a crop row 12 of seedlings of a relatively small size, etc., a decrease in the detection accuracy due to a missing seedling can be suppressed.

Although the processor 122 is illustrated as detecting crop rows 12, it may be configured to detect ridges, instead of or in addition to crop rows 12.

The row detection system 1000 may include three or more imaging devices. Detecting a crop row or ridge based on images acquired by three or more imaging devices allows the approximation line of the crop row or ridge to be determined more accurately.

Next, a more specific example of a row detection system according to an example embodiment of the present disclosure will be described. In the present example embodiment, detection of crop rows is performed as a "row detection".

As shown in FIG. 1, the row detection system 1000 according to the present example embodiment includes the first imaging device 120, the second imaging device 121, and the processor 122. Each of the first imaging device 120 and the second imaging device 121 is fixed to the agricultural machine so as to acquire time-series color images containing at least a portion of the ground surface.

Figure 9:
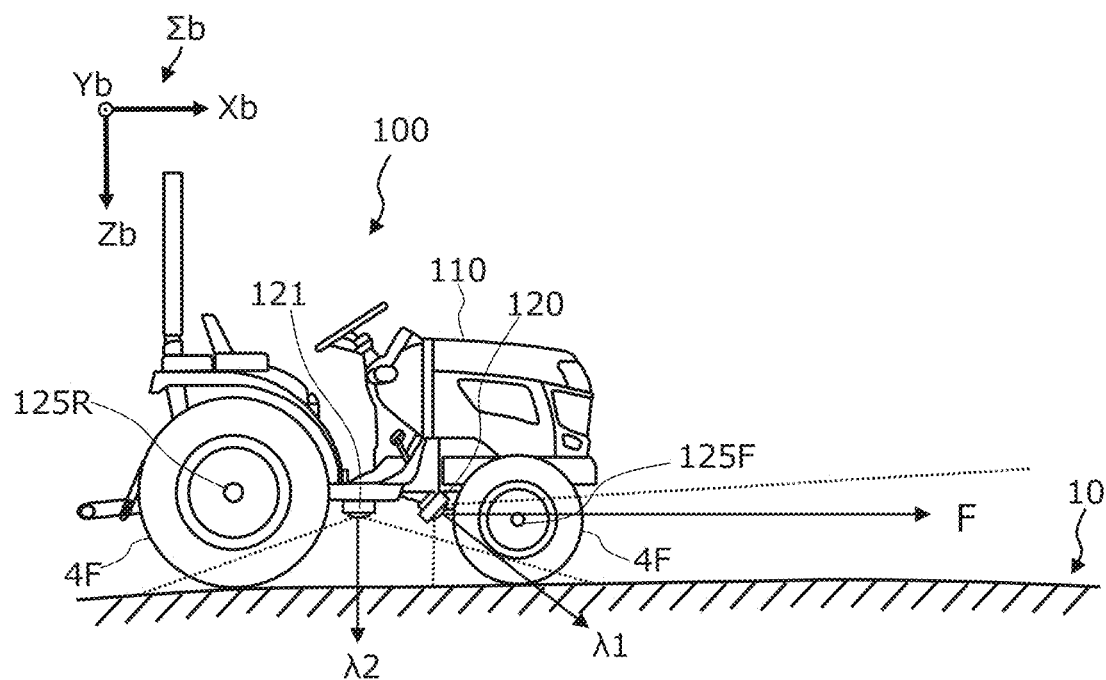
FIG. 9 is a side view schematically showing how a first imaging device and a second imaging device that are mounted to an agricultural machine may image the ground surface.

FIG. 9 schematically shows how the first imaging device 120 and the second imaging device 121 that are mounted to the agricultural machine 100 may image the ground surface 10, for example. In the example of FIG. 9, the agricultural machine 100 includes a vehicle body 110 that is capable of traveling, and the first imaging device 120 and the second imaging device 121 is fixed to the vehicle body 110. For referencing sake, FIG. 9 shows a vehicle coordinate system Σb having an Xb axis, a Yb axis, and a Zb axis that are orthogonal to one another. The vehicle coordinate system Σb is a coordinate system that is fixed to the agricultural machine 100, and the origin of the vehicle coordinate system Σb may be set near the centroid of the agricultural machine 100, for example. In the figure, for ease of viewing, the origin of the vehicle coordinate system Σb is illustrated as lying external to the agricultural machine 100. In the vehicle coordinate system Σb according to an example embodiment of the present disclosure, the Xb axis coincides with the traveling direction (direction of arrow F) when the agricultural machine 100 is traveling straight. When viewing from the coordinate origin in the positing direction along the Xb axis, the Yb axis coincides with the directly right direction, and the Zb axis coincides with the vertically downward direction.

Each of the first imaging device 120 and the second imaging device 121 is, for example, an onboard camera that includes a CCD (Charge Coupled Device) or a CMOS (Complementary Metal Oxide Semiconductor) image sensor. Each of the imaging devices 120 and 121 according to the present example embodiment is a monocular camera that is capable of capturing motion pictures at a frame rate of 3 frames/second (fps: frames per second) or above, for example.

The image sensor in the imaging devices 120 and 121 includes a multitude of photodetection cells that are arranged in rows and columns. Each individual photodetection cell corresponds to one of the pixels of an image, and includes an R subpixel to detect the intensity of red light, a G subpixel to detect the intensity of green light, and a B subpixel to detect the intensity of blue light. The light outputs to be detected by the R subpixel, the G subpixel, and the B subpixel of each photodetection cell may be referred to as an R value, a G value, and a B value, respectively. Hereinafter, an R value, a G value, and a B value may be collectively referred to as "pixel values" or "RGB values". By using an R value, a G value, and a B value, it is possible to define a color based on coordinate values within an RGB color space.

Figure 10:
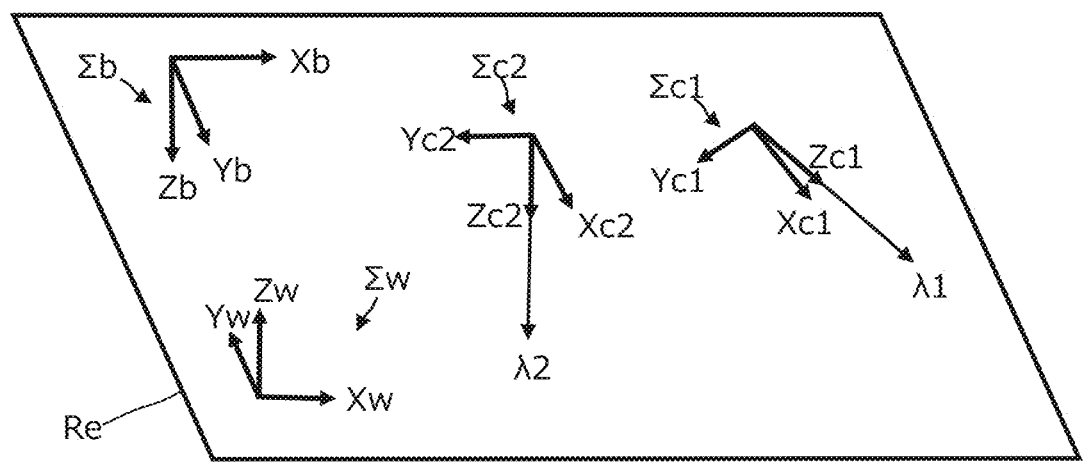
FIG. 10 is a perspective view schematically showing a relationship among a vehicle coordinate system Σb, a camera coordinate system Σc1 of the first imaging device, a camera coordinate system Σc2 of the second imaging device, and a world coordinate system Σw that is fixed to the ground surface.

FIG. 10 is a perspective view schematically showing a relationship among the aforementioned vehicle coordinate system Σb, a camera coordinate system Σc1 of the first imaging device 120, the camera coordinate system Σc2 of the second imaging device 121, and a world coordinate system Σw that is fixed to the ground surface 10. The camera coordinate system Σc1 of the first imaging device 120 has an Xc1 axis, a Yc1 axis, and a Zc1 axis that are orthogonal to one another. The camera coordinate system Σc2 of the second imaging device 121 has an Xc2 axis, a Yc2 axis, and a Zc2 axis that are orthogonal to one another. The world coordinate system Σw has an Xw axis, a Yw axis, and a Zw axis that are orthogonal to one another. In the example of FIG. 10, the Xw axis and the Yw axis of the world coordinate system Σw are on a reference plane Re that expands along the ground surface 10.

The first imaging device 120 is mounted at a first position of the agricultural machine 100 so as to face in a first direction. The second imaging device 121 is mounted at a second position, which is rearward of the first position, of the agricultural machine 100 so as to face in a second direction. Therefore, the position and orientation of each of the camera coordinate systems Σc1 and Σc2 with respect to the vehicle coordinate system Σb are fixed in a known state. The Zc1 axis of the camera coordinate system Σc1 of the first imaging device 120 is on a camera optical axis λ1 of the first imaging device 120. The Zc2 axis of the camera coordinate system Σc2 of the second imaging device 121 is on a camera optical axis λ2 of the second imaging device 121. In the illustrated example, camera optical axes λ1 and λ2 are inclined from the traveling direction F of the agricultural machine 100 toward the ground surface 10, and their angles of depression are greater than 0°. The traveling direction F of the agricultural machine 100 is schematically parallel to the ground surface 10 along which the agricultural machine 100 is traveling. The angle of depression of the camera optical axis λ1 of the first imaging device 120 (i.e., the angle made between the traveling direction F and the camera optical axis λ1) may be set to a range of, e.g., about 0° to about 90°. The angle of depression of the camera optical axis λ2 of the second imaging device 121 (i.e., the angle made between the traveling direction F and the camera optical axis λ2) may be set to a range of, e.g., about 45° to about 135°. In the example shown in FIG. 9, the camera optical axis λ1 of the first imaging device 120 has an angle of depression of about 40°, whereas the camera optical axis λ2 of the second imaging device 121 has an angle of depression of about 90°, for example. As in this example, the first imaging device 120 may be mounted obliquely forward and downward at the first position of the agricultural machine 100. The second imaging device 121 may be mounted downward at the second position of the agricultural machine 100. As used herein, "obliquely forward and downward" means the angle of depression of the camera optical axis being in a range of not less than about 10° and not more than about 80°, for example. On the other hand, "downward" means the angle of depression of the camera optical axis being in a range of not less than about 80° and not more than about 100°, for example.

In the example shown in FIG. 9, the first imaging device 120 and the second imaging device 121 are both mounted at the bottom of the vehicle body 110. The second imaging device 121 is mounted rearward of the first imaging device 120. In other words, an Xb coordinate value of the second imaging device 121 in the vehicle coordinate system Σb is smaller than an Xb coordinate value of the first imaging device 120. In the example of FIG. 9, the imaging devices 120 and 121 are both located near the center along the width direction (Yb direction) of the vehicle body 110. Without being limited to the bottom of the vehicle body 110, each of the imaging devices 120 and 121 may be mounted at any other position, e.g., sides, front, or rear. As in the present example embodiment, in the case where the imaging devices 120 and 121 are provided at the bottom of the vehicle body 110, it is possible to detect a crop row or ridge under the agricultural machine 100.

FIG. 9 illustrates an imaging area of the first imaging device 120 and an imaging area of the second imaging device 121 with dotted lines having a radial expanse. The imaging area of each of the first imaging device 120 and the second imaging device 121 includes a portion of the ground surface 10 that is located under the agricultural machine 100. Moreover, the imaging area of each of the first imaging device 120 and the second imaging device 121 includes at least a portion(s) of the wheels of the agricultural machine 1100. The imaging area of each of the first imaging device 120 and the second imaging device 121 may be sized so as to be longer along the front-rear direction of the agricultural machine 100 than along the right-left direction. Preferably, the imaging area of the first imaging device 120 and the imaging area of the second imaging device 121 partially overlap. When the first image generated by the first imaging device 120 and the second image generated by the second imaging device 121 have an overlapping portion, it becomes possible to generate a planar panoramic image from the first image and the second image.

In the present example embodiment, the imaging area of the first imaging device 120 includes a portion of the ground surface 10 that is located directly under a front wheel axis 125F of the agricultural machine 100. On the other hand, the imaging area of the second imaging device 121 includes a portion of the ground surface 10 that is located directly under a rear wheel axis 125R of the agricultural machine 100. Therefore, a crop row or ridge near front wheels 4F and the rear wheels 4R can be detected with a high accuracy.

When the agricultural machine 100 is traveling on the ground surface 10, the vehicle coordinate system $\Sigma b$ and the camera coordinate systems $\Sigma c1$ and $\Sigma c2$ translate relative to the world coordinate system $\Sigma w$. If the agricultural machine 100 rotates or swings in directions of pitch, roll, and yaw during travel, the vehicle coordinate system $\Sigma b$ and the camera coordinate camera coordinate systems $\Sigma c1$ and $\Sigma c2$ rotate relative to the world coordinate system $\Sigma w$. In the following description, for simplicity, it is assumed that the agricultural machine 100 does not rotate in pitch and roll directions and that the agricultural machine 100 moves essentially parallel to the ground surface 10.

Figure 11:
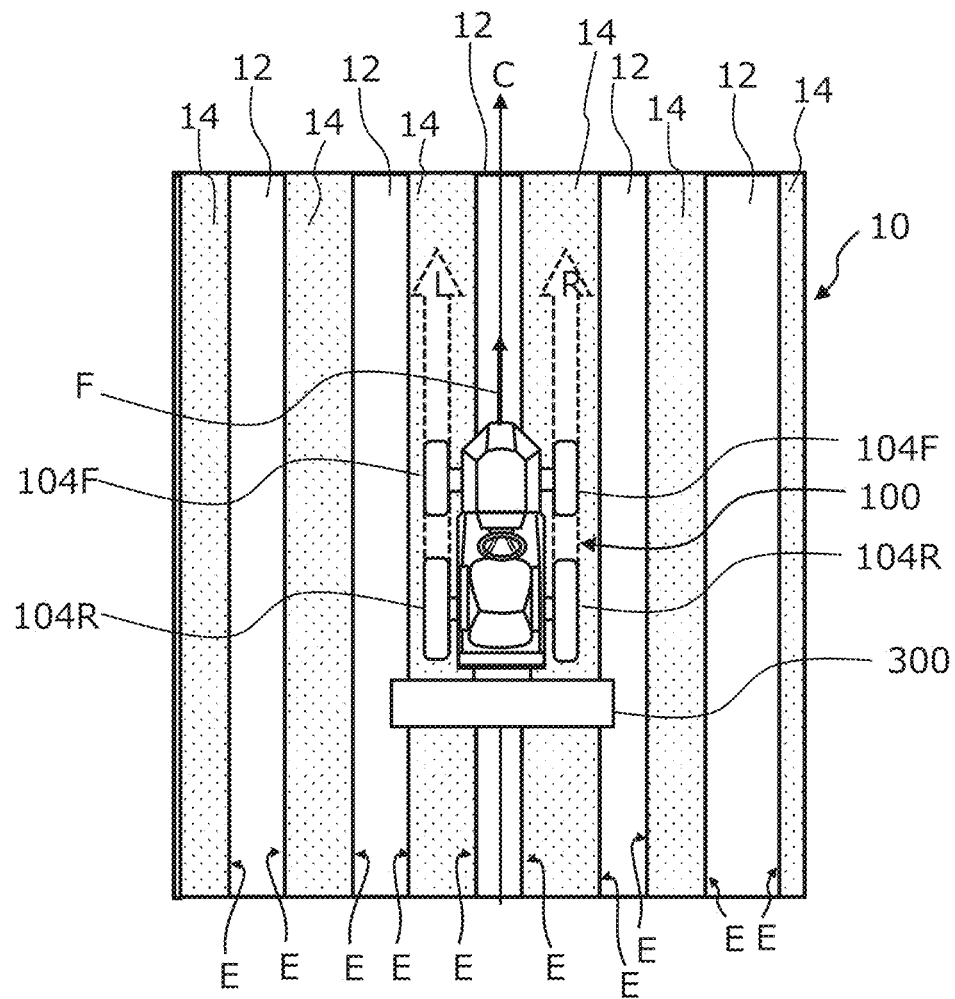
FIG. 11 is a top view schematically showing a portion of a field in which a multiple crop rows are made on the ground surface.

FIG. 11 is a top view schematically showing a portion of a field in which a multiple crop rows 12 are made on the ground surface 10. A crop row 12 is a row that is formed as crops are continuously planted on the ground surface 10 of the field in one direction. For example, a crop row 12 may be an aggregation of crops that are planted in a ridge of the field. Thus, because each individual crop row 12 is a row that is created by an aggregation of crops that have been planted in the field, strictly speaking, the shape of a crop row may be complex depending on the shapes of crops and the arrangement of crops. The width of the crop row 12 changes with crop growth. Between adjacent crop rows 12, a belt-shaped intermediate region 14, in which no crops have been planted, exists. In between two adjacent crop rows 12, each intermediate region 14 is a region that is interposed between two opposing edge lines E. In the case where multiple crops are planted for one ridge in a width direction of the ridge, multiple crop rows 12 will be formed upon the one ridge. In such a case, among the multiple crop rows 12 that are formed on the ridge, an edge line E of the crop row 12 that is located at an end of the width direction of the ridge serves as a delineator of an intermediate region 14. In other words, an intermediate region 14 lies between the edge lines E of crop rows 12 that are located at ends of ridges along the width direction, among the edge lines E of multiple crop rows 12. Since an intermediate region 14 functions as a region through which the wheels of the agricultural machine 100 may pass, an "intermediate region" may be referred to as a "work path".

In the present disclosure, an "edge line" of a crop row means a reference line segment (which may also include a curve) for defining a target path for an agricultural machine to travel. Such reference line segments may be defined as both ends of a belt-shaped region (work path) through which the wheels of the agricultural machine are allowed to pass. The specific method of determining the "edge lines" of a crop row will be described later.

FIG. 11 schematically depicts an agricultural machine 100 that is traveling in a field in which crop rows 12 are made. The agricultural machine 100 includes right and left front wheels 104F and right and left rear wheels 104R as traveling equipment 145, and is towing an implement 300. The front wheels 104F are the wheels responsible for steering.

In the example of FIG. 11, thick broken-lined arrows L and R are indicated for the respective work paths 14 that are located on opposite sides of a crop row 12 in the middle. When the agricultural machine 100 travels on a target path that is indicated by a solid-lined arrow C, the front wheels 104F and the rear wheels 104R of the agricultural machine 100 are expected to move along the arrows L and R in the work paths 14, so as not to step on the crop row 12. In the present example embodiment, the edge lines E of the crop row 12 can be detected by using the imaging devices 120 and 121 mounted to the agricultural machine 100. This makes it possible to control the steering and travel of the agricultural machine 100 so that the front wheels 104F and the rear wheels 104R will move along arrows L and R in the work paths 14. Controlling the steering and travel of the agricultural machine 100 based on the edge lines E of the crop row 12 in this manner can be referred to as "row-following control".

Figure 12:
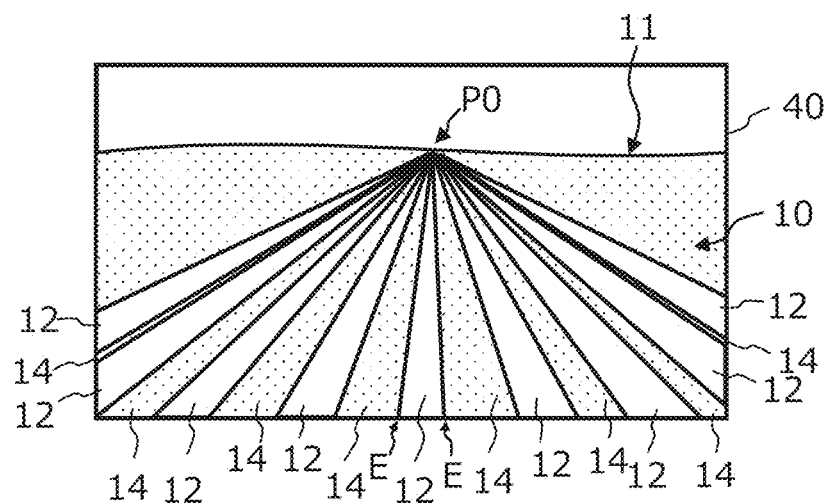
FIG. 12 is a diagram schematically showing an example of an image that is acquired by the imaging device of the agricultural machine shown in FIG. 11.

FIG. 12 is a diagram schematically showing an example of an image 40 that is acquired by the first imaging device 120 of the agricultural machine 100 shown in FIG. 11. For ease of understanding, the front wheels 104F of the agricultural machine 100 that may be included in the image 40 are omitted from illustration in FIG. 12. Theoretically, the multiple crop rows 12 and intermediate regions (work paths) 14 extending in parallel on the ground surface 10 intersect at a vanishing point P0 on the horizon 11. The vanishing point P0 is located in a central region of the image 40.

Figure 13:
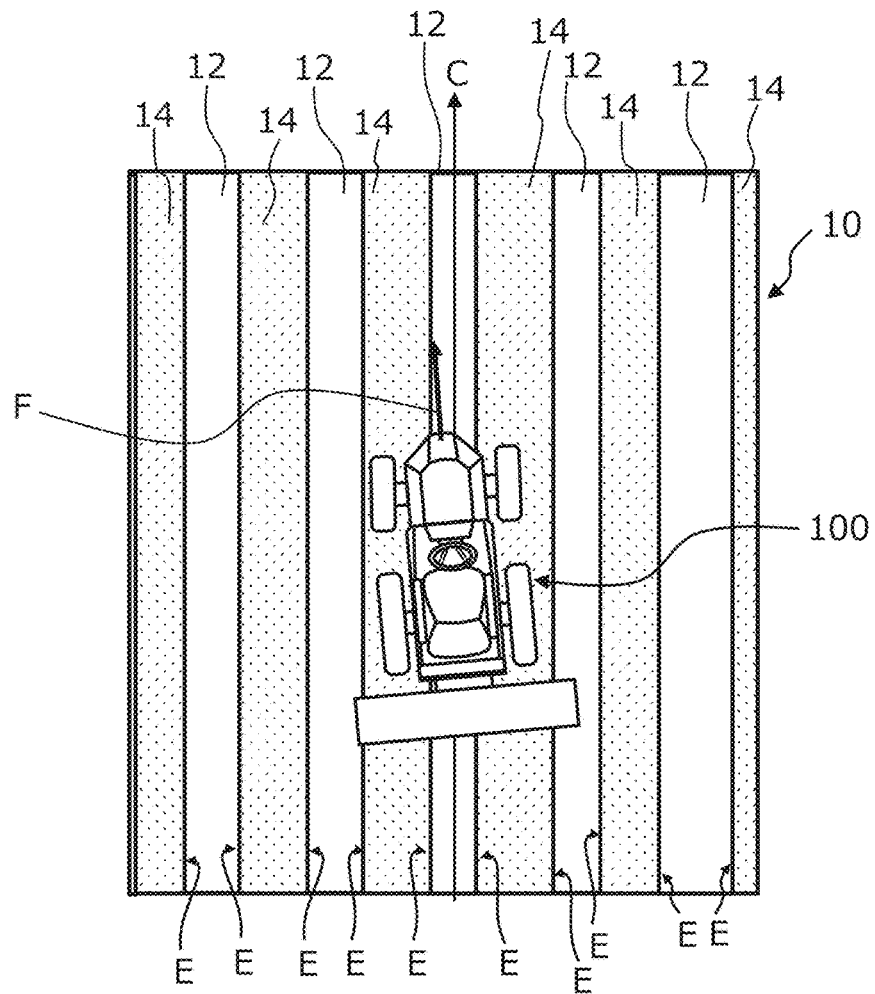
FIG. 13 is a top view schematically showing a state where the traveling direction of the agricultural machine is inclined with respect to the direction in which a crop row extends.
Figure 14:
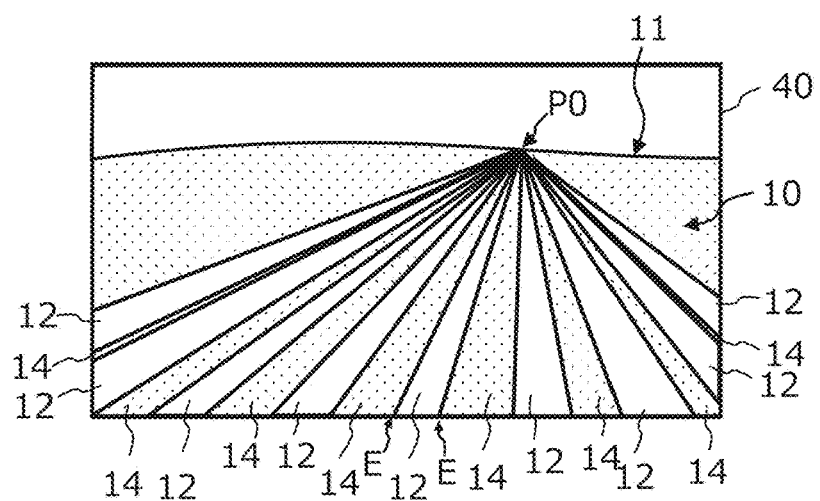
FIG. 14 is a diagram schematically showing an example of an image acquired by the imaging device of the agricultural machine shown in FIG. 13.

FIG. 13 is a top view schematically showing a state where the traveling direction F of the agricultural machine 100 is inclined with respect to the direction in which the crop row 12 extends. FIG. 14 is a diagram schematically showing an example of an image 40 acquired by the first imaging device 120 of the agricultural machine 100 shown in FIG. 13. In a case where the traveling direction F of the agricultural machine 100 is inclined with respect to the direction in which the crop row 12 extends (direction parallel to arrow C), the vanishing point P0 is located in a right or left region in the image 40. In the example shown in FIG. 14, the vanishing point P0 is located in a right region of the image 40.

The agricultural machine 100 includes the row detection system 1000 and the automatic steering device 124 shown in FIG. 1. The processor 122 in the row detection system 1000 generates a first plan view image and a second plan view image based on the first image generated by the first imaging device 120 and the second image generated by the second imaging device 121. In an example embodiment of the present disclosure, the processor 122 determines a region of interest by performing the above-described process. Moreover, the processor 122 may detect a crop row 12 that is included in the region of interest and linearly approximate the detected crop row 12 to obtain an approximation line. The processor 122 determines a target path for the agricultural machine 100 along the approximation line. The automatic steering device 124 performs steering control so that the agricultural machine 100 travels along the target path. Thus, the agricultural machine 100 can perform "row-following travel" along the detected crop row.

The automatic steering device 124 performs steering control for the agricultural machine 100 so as to reduce positional deviation and directional deviation of the agricultural machine 100 with respect to the target path (arrow C shown in FIG. 13). As a result of this, the agricultural machine 100 being in a state shown in e.g. FIG. 13 has its position and orientation (i.e., angle regarding the yaw direction) adjusted, thus approaching the state shown in FIG. 11. The left and right wheels of the agricultural machine 100 in the state of FIG. 11 are respectively located on lines in work paths 14 indicated by arrow L and arrow R. When row-following travel through automatic steering is started and the agricultural machine 100 travels along a target path C indicated by central arrow C in FIG. 13, the automatic steering device 124 in the agricultural machine 100 controls the steering angles of the wheels responsible for steering so that each of the front wheels 104F and the rear wheels 104R will not deviate from the work paths 14.

Figure 15:
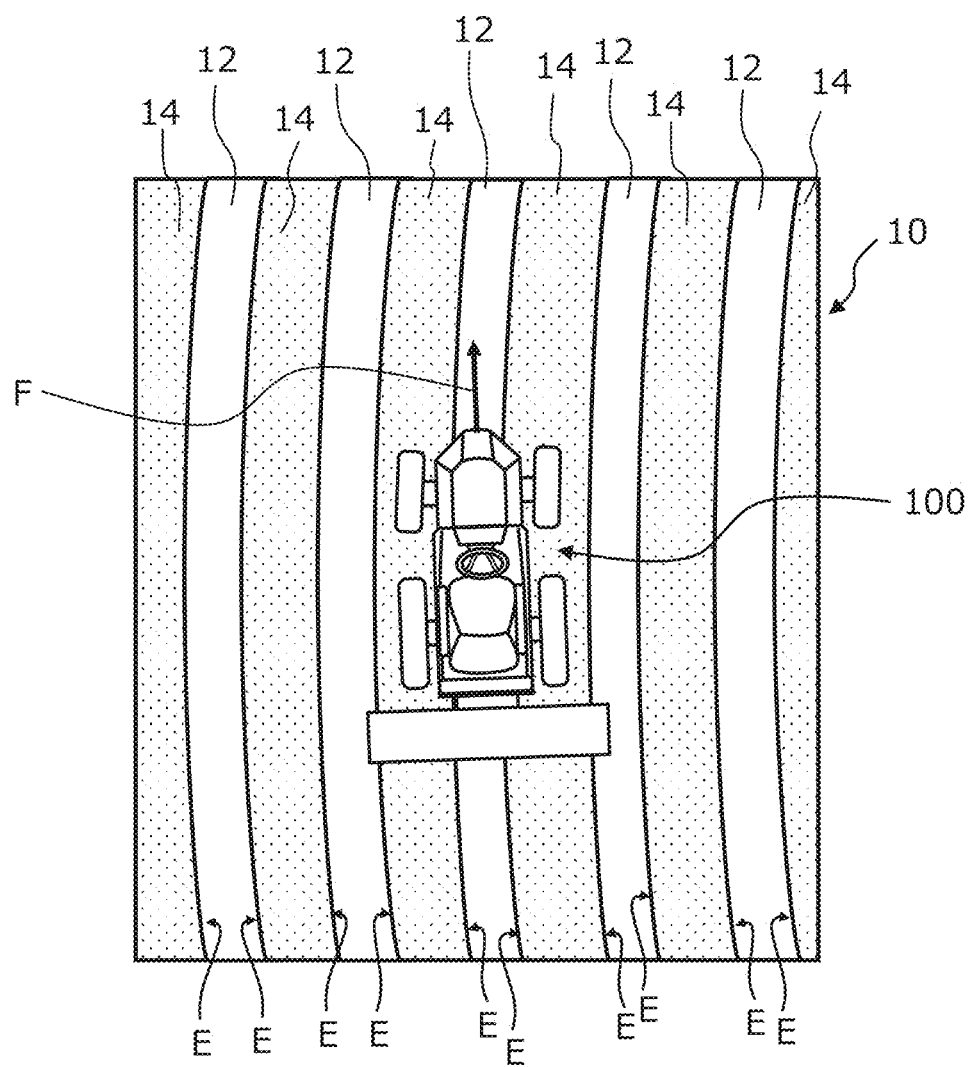
FIG. 15 is a top view schematically showing a portion of a field in which a plurality of crop rows in curved shapes are made on the ground surface.

FIG. 15 is a top view schematically showing a portion of a field in which a plurality of crop rows in curved shapes are made on the ground surface 10. According to the present example embodiment, even in a field where crop rows 12 in curved shapes are made, the positions of a crop row 12 are accurately detected from two images acquired by the two imaging devices 120 and 121, thus enabling precise control of the steering and travel of the agricultural machine 100 along the crop row 12.

Now, the configuration and operation of the processor 122 in the row detection system 1000 will be described in more detail.

The processor 122 according to the present example embodiment performs image processing for time-series color images acquired from the imaging devices 120 and 121. The processor 122 is connected to the automatic steering device 124 of the agricultural machine 100. The automatic steering device 124 may be included in a controller configured or programmed to control the travel of the agricultural machine 100, for example.

The processor 122 can be implemented by an electronic control unit (ECU) for image processing. The ECU is a computer for onboard use. The processor 122 is connected to the imaging devices 120 and 121 via serial signal lines, e.g., a wire harness, so as to receive image data that is output from the imaging devices 120 and 121. A portion of the image recognition processing that is performed by the processor 122 may be performed inside the imaging devices 120 and 121 (inside a camera module).

Figure 16:
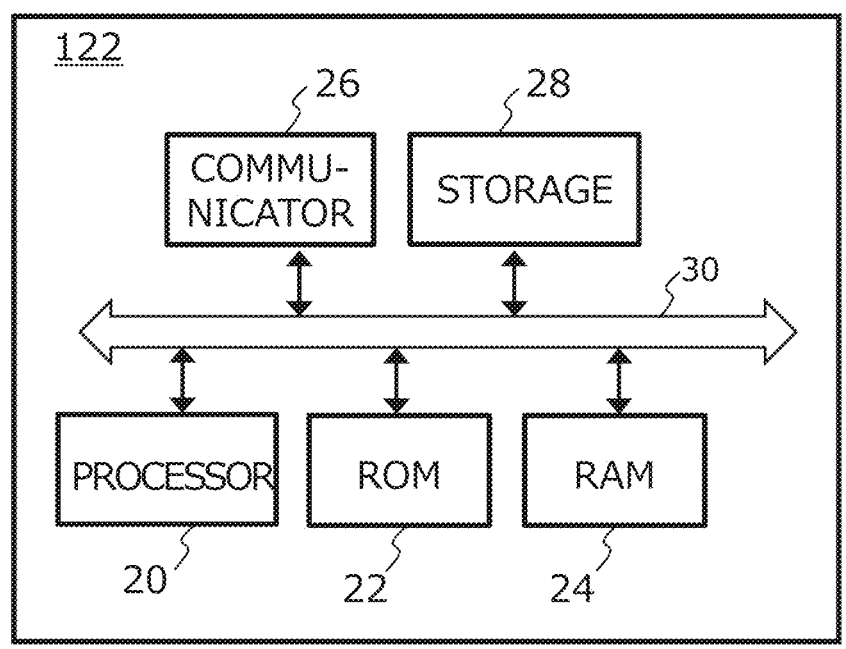
FIG. 16 is a block diagram showing an example hardware configuration of the processor.

FIG. 16 is a block diagram showing an example hardware configuration of the processor 122. The processor 122 includes a processor 20, a ROM (Read Only Memory) 22, a RAM (Random Access Memory) 24, a communicator 26, and a storage 28. These component elements are connected to one another via buses 30.

The processor 20 is a semiconductor integrated circuit, and referred to also as a central processing unit (CPU) or a microprocessor. The processor 20 may include an image processing unit (GPU). The processor 20 consecutively executes a computer program describing predetermined instructions, which is stored in the ROM 22, to realize processing that is needed for the row detection according to the present disclosure. A whole or a portion of the processor 20 may be an FPGA (Field Programmable Gate Array), an ASIC (Application Specific Integrated Circuit), or an ASSP (Application Specific Standard Product) in which a CPU is mounted.

The communicator 26 is an interface to perform data communication between the processor 122 and an external computer. The communicator 26 can perform wired communication based on a CAN (Controller Area Network) or the like, or wireless communication complying with the Bluetooth (registered trademark) standards and/or the Wi-Fi (registered trademark) standards.

The storage 28 is able to store data of images acquired from the imaging device 120 or images which are under processing. Examples of the storage 28 include a hard disk drive and a non-volatile semiconductor memory.

The hardware configuration of the processor 122 is not limited to the above examples. A whole or a portion of the processor 122 does not need to be mounted on the agricultural machine 100. By utilizing the communicator 26, one or more computers located outside the agricultural machine 100 may be allowed to function as a whole or a portion of the processor 122. For example, a server computer that is connected to a network may function as a whole or a portion of the processor 122. On the other hand, a computer mounted in the agricultural machine 100 may perform all functions that are required of the processor 122.

Figure 17:
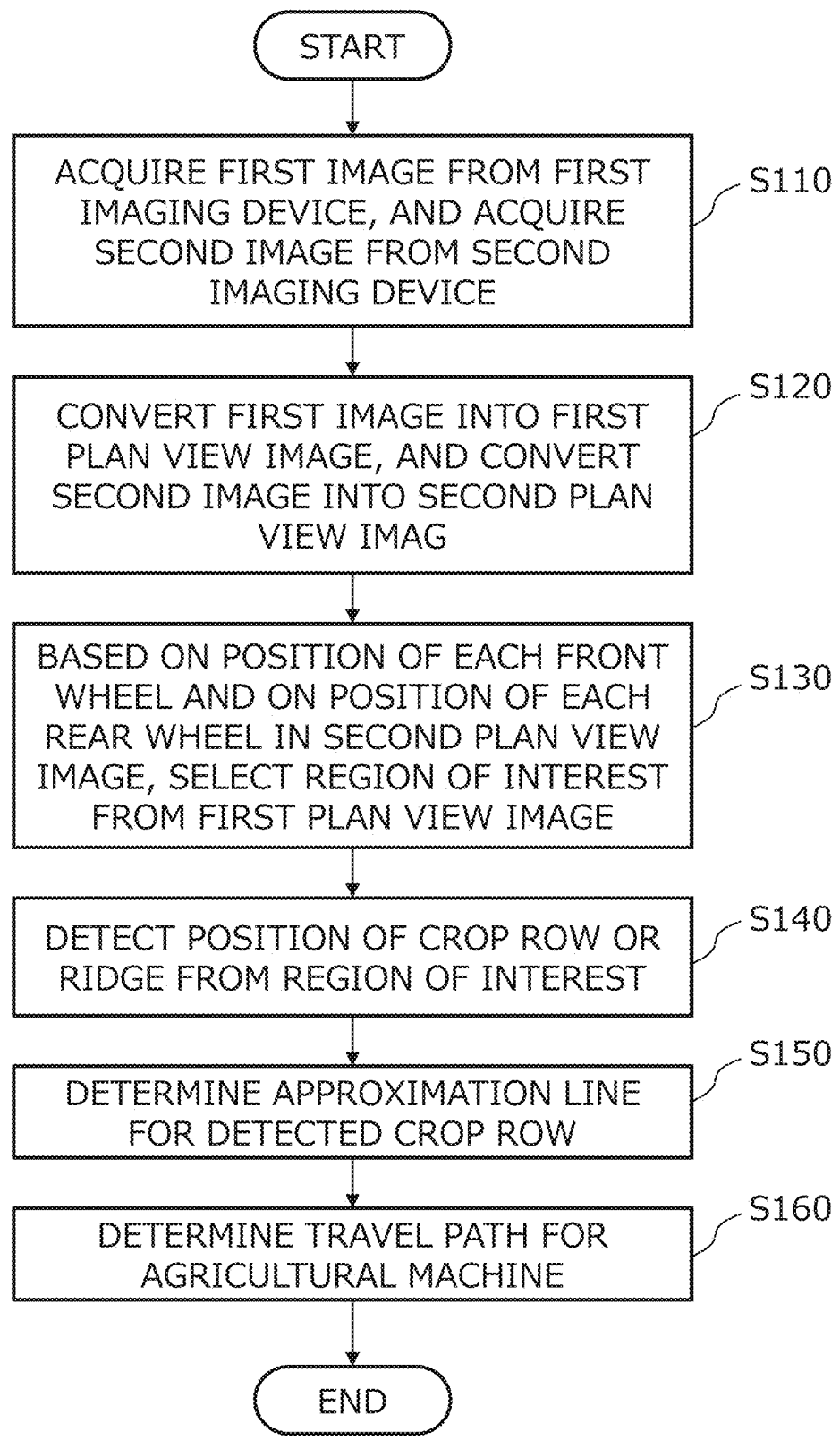
FIG. 17 is a flowchart showing an example operation of the processor.

FIG. 17 is a flowchart showing an example operation of the processor 122 according to the present example embodiment. By performing the operation from steps S110 to S160 shown in FIG. 17, the processor 122 detects a crop row on the ground surface, and determines a target path for the agricultural machine 100 along the crop row.

At step S110, the processor 122 acquires a first image from the first imaging device 120, and acquires a second image from the second imaging device 121. In the present example embodiment, each of the first image and the second image is a time-series color image. The time-series color images are an aggregation of images that are chronologically generated by the imaging devices 120 and 121 through imaging. Each image is composed of a frame-by-frame group of pixels. For example, when the imaging devices 120 and 121 outputs images at a frame rate of 30 frames/second, the processor 122 is able to acquire new images with a period of about 33 milliseconds. As compared to the speed of a common automobile that travels on public roads, the agricultural machine 100, such as a tractor, travels in a field at a speed which is relatively low, e.g., about 10 kilometers per hour or lower. In the case of about 10 kilometers per hour, a distance of about 6 centimeters is traveled in about 33 milliseconds, for example. Therefore, the processor 122 may acquire images with a period of, e.g., about 100 milliseconds to about 300 milliseconds, and does not need to process every frame of image captured by the imaging devices 120 and 121. The period in which images to be processed by the processor 122 are acquired may be automatically changed by the processor 122 in accordance with the traveling speed of the agricultural machine 100.

At step S120, the processor 122 performs homography transformation for the first image and the second image, which were captured essentially at the same time, thus generating a first plan view image and a second plan view image. As necessary, the processor 122 controls the imaging devices 120 and 121 so as to synchronize the time of acquiring the first image and the time of acquiring the second image.

The plan view image is an overhead view image in which a reference plane that is parallel to the ground surface is viewed directly from above along the normal direction of the reference plane. This overhead view image can be generated from the first image and the second image through homography transformation. Homography transformation is a kind of geometric transformation where a point that is on a given plane in a three-dimensional space can be converted to a point that is on another arbitrary plane. Hereinafter, an example process of converting the first image acquired by the first imaging device 120 into a first plan view image will be described. The process of converting the second image acquired by the second imaging device 121 into a second plan view image is also performed in a similar manner.

Figure 18:
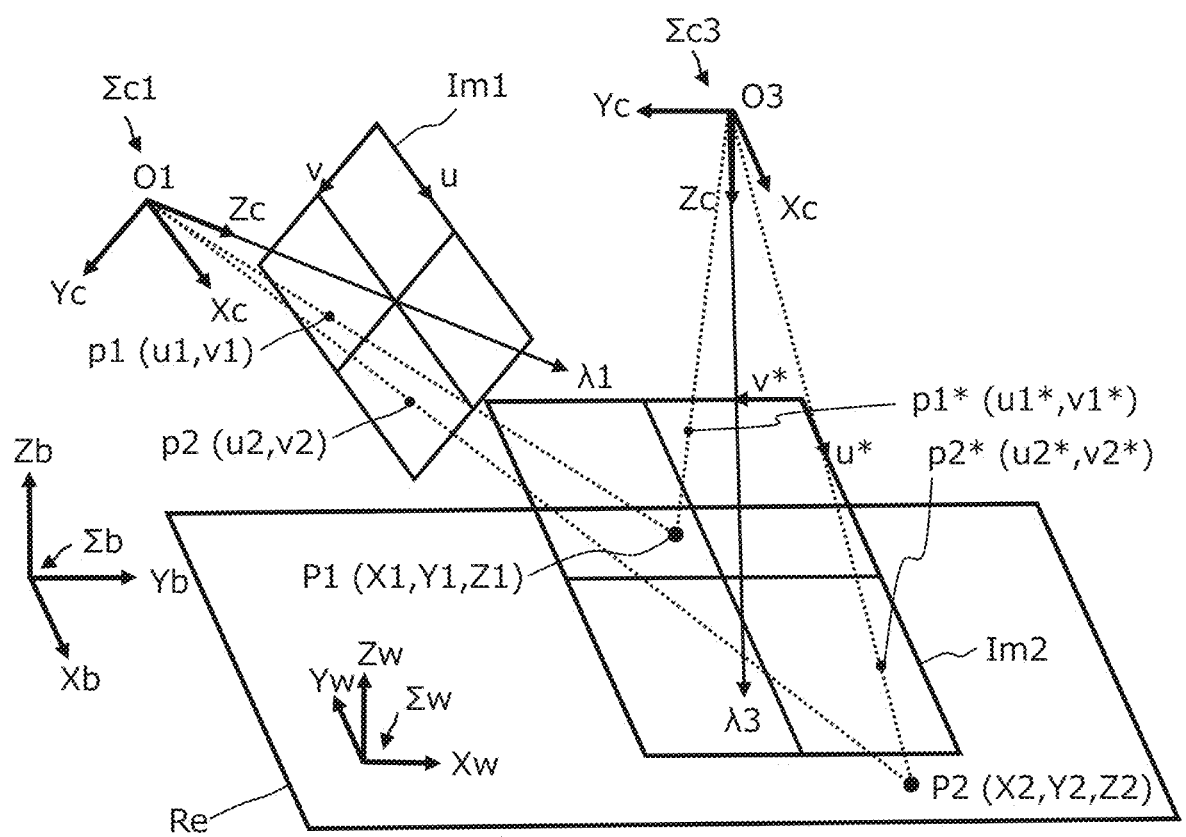
FIG. 18 is a perspective view schematically showing the relative locations between each of a camera coordinate system Σc1 of an imaging device that has a first pose and a camera coordinate system Σc3 of an imaginary imaging device that has a second pose; and a reference plane Re.

FIG. 18 is a perspective view schematically showing the relative locations between each of a camera coordinate system $\Sigma c1$ of the imaging device 120 that has a first pose (position and orientation) and a camera coordinate system $\Sigma c3$ of an imaginary imaging device that has a second pose, and the reference plane Re. FIG. 18 also shows the vehicle coordinate system $\Sigma b$. In the example illustrated in FIG. 18, the camera coordinate system $\Sigma c1$ is inclined so that its Zc axis obliquely intersects the reference plane Re. On the other hand, the camera coordinate system $\Sigma c3$ has its Zc axis lying orthogonal to the reference plane Re. In a case where the agricultural machine 100 does not rotate in pitch and roll directions, a plane that includes the Xb axis and the Yb axis of the vehicle coordinate system Σb (Hereinafter, referred to as the "vehicle coordinate system plane") is parallel to the reference plane Re. In this case, the Zc axis of the camera coordinate system Σc3 is also orthogonal to the vehicle coordinate system plane. In other words, the camera coordinate system Σc3 is placed in a state that allows for acquiring an overhead view image in which the reference plane Re is viewed directly from above along the normal direction of the reference plane Re and the vehicle coordinate system plane.

At a position that is distant from an origin O1 of the camera coordinate system Σc1 by the focal length of the camera along the Zc axis, an imaginary image plane Im1 exists. The image plane Im1 is orthogonal to the Zc axis and the camera optical axis λ1. A pixel position on the image plane Im1 is defined by an image coordinate system having a u axis and a v axis that are orthogonal to each other. For example, a point P1 and a point P2 located on the reference plane Re may have coordinates (X1, Y1, Z1) and (X2, Y2, Z2) in the world coordinate system Σw, respectively. In the example of FIG. 18, the Xw axis and the Yw axis of the world coordinate system Σw are on the reference plane Re. Therefore, Z1=Z2=0. The reference plane Re is set so as to expand along the ground surface.

Through perspective projection based on a pinhole camera model, the point P1 and the point P2 on the reference plane Re are converted, respectively, into a point p1 and a point p2 on the image plane Im1 of the imaging device 120 having the first pose. On the image plane Im1, the point p1 and the point p2 are at pixel positions indicated by coordinates (u1, v1) and (u2, v2), respectively.

Assuming that the imaging device has the second pose, an imaginary image plane Im2 exists at a position that is distant from an origin O3 of the camera coordinate system Σc3 by the focal length of the camera along the Zc axis. In this example, the image plane Im2 is parallel to the reference plane Re and the vehicle coordinate system plane. A pixel position on the image plane Im2 is defined by an image coordinate system having a $u^+$ axis and a $v^+$ axis that are orthogonal to each other. Together with the vehicle coordinate system Σb, this image coordinate system moves relative to the world coordinate system Σw. Therefore, a pixel position on the image plane Im2 can also be defined in terms of the vehicle coordinate system Σb. Through perspective projection, a point P1 and a point P2 on the reference plane Re are converted, respectively, into a point p1* and a point p2* on the image plane Im2. On the image plane Im2, the point p1* and point p2* are at pixel positions indicated by coordinates (u1*, v1*) and (u2*, v2*), respectively.

Once the relative locations of the camera coordinate systems Σc1 and Σc3 with respect to the reference plane Re in the world coordinate system Σw are given, then, for a given point (u, v) on the image plane Im1, it is possible to determine a corresponding point (u*, v*) on the image plane Im2 through homography transformation. When point coordinates are expressed by a homogeneous coordinate system, such homography transformation is defined by a transformation matrix H of 3 rows×3 columns.

$$\begin{pmatrix} u* \\ v* \\ 1 \end{pmatrix} = H \begin{pmatrix} u \\ v \\ 1 \end{pmatrix} \qquad \text{Equation 1}$$

The content of the transformation matrix H is defined by numerical values of $h_{11}, h_{12}, \ldots, h_{32}$, as indicated below.

$$\begin{pmatrix} u* \\ v* \\ 1 \end{pmatrix} = \begin{pmatrix} h11 & h12 & h13 \\ h21 & h22 & h23 \\ h31 & h32 & 1 \end{pmatrix} \begin{pmatrix} u \\ v \\ 1 \end{pmatrix} \qquad \text{Equation 2}$$

The eight numerical values ($h_{11}, h_{12}, \ldots, h_{32}$) can be calculated by a known algorithm once a calibration board that is placed on the reference plane Re is imaged by the imaging device 120 mounted to the agricultural machine 100.

When a point on the reference plane Re has coordinates (X, Y, 0), the coordinates of the corresponding points on the respective camera image planes Im1 and Im2 are associated with the point (X, Y, 0) by respective homography transformation matrices H1 and H2, as indicated by the formulae of Equations 3 and 4 below.

$$\begin{pmatrix} u \\ v \\ 1 \end{pmatrix} = H1 \begin{pmatrix} X \\ Y \\ 1 \end{pmatrix} \qquad \text{Equation 3}$$

$$\begin{pmatrix} u* \\ v* \\ 1 \end{pmatrix} = H2 \begin{pmatrix} X \\ Y \\ 1 \end{pmatrix} \qquad \text{Equation 4}$$

From the above two formulae, the following formula is derived. As is clear from this formula, the transformation matrix H is equal to $H2H1^{-1}$. $H1^{-1}$ is an inverse of H1.

$$\begin{pmatrix} u* \\ v* \\ 1 \end{pmatrix} = H2H1^{-1} \begin{pmatrix} u \\ v \\ 1 \end{pmatrix} \qquad \text{Equation 5}$$

The content of the transformation matrices H1 and H2 depends on the reference plane Re; therefore, if the position of the reference plane Re changes, the content of the transformation matrix H also changes.

By utilizing such homography transformation, a plan view image of the ground surface can be generated from an image of the ground surface acquired by the imaging device 120 having the first pose. In other words, through homography transformation, coordinates of a given point on the image plane Im1 of the imaging device 120 can be converted into coordinates of a point that is on the image plane Im2 of an imaginary imaging device having a predetermined pose with respect to the reference plane Re.

After calculating the content of the transformation matrix H, the processor 122 executes a software program based on the aforementioned algorithm to generate, from time-series images that are output from the imaging device 120, overhead view images in which the ground surface 10 is viewed from above. Prior to the process of generating overhead view images, white balance, noise reduction, or other preprocessing may be applied to the time-series images.

In the above description, it is assumed that points (e.g., P1, P2) in a three-dimensional space are all located on the reference plane Re (e.g., Z1=Z2=0). In the case where the height of a crop with respect to the reference plane Re is non-zero, in the plan view image resulting after homography transformation, the position of a corresponding point will be shifted from its proper position. In order to suppress an increase in the amount of shift, it is desirable that the height of the reference plane Re is close to the height of the crop for detection. Bumps and dents, e.g., ridges, furrows, or trenches, may exist on the ground surface 10. In such cases, the reference plane Re may be offset upward from the bottoms of such bumps and dents. The offset distance may be appropriately set depending on the bumps and dents of the ground surface 10 on which crops are planted.

While the agricultural machine 100 is traveling on the ground surface 10, if the vehicle body 110 (see FIG. 9) undergoes a roll or pitch motion, the pose of the imaging device 120 changes, whereby the content of the transformation matrix H1 may change. In such a case, angles of rotation of roll and pitch of the vehicle body 110 may be measured with an inertial measurement unit (IMU), and the transformation matrix H1 and the transformation matrix H can be corrected in accordance with the changes in the pose of the imaging device 120.

By a method similar to the conversion from the first image acquired by the first imaging device 120 into a first plan view image, the processor 122 can convert the second image acquired by the second imaging device 121 into a second plan view image. The first plan view image and the second plan view image are both generated as images on the imaginary image plane Im2. The first plan view image and the second plan view image may be expressed by xb coordinates and yb coordinates in the vehicle coordinate system Σb. Because the imaging area of the first imaging device 120 and the imaging area of the second imaging device 121 partially overlap as shown in FIG. 9, the first plan view image and the second plan view image include an overlapping portion (overlap region).

Once the first plan view image and the second plan view image are generated, the processor 122 may merge them to generate a composite image, e.g., a planar panoramic image. For example, the processor 122 may generate a composite image through a merging process that involves taking a weighted mean between the pixel value of each pixel in a first overlap region in the first plan view image that overlaps the second plan view image, and the pixel value of the corresponding pixel in a second overlap region in the second plan view image that overlaps the first plan view image, where the weight depends on the position of the respective pixel.

As shown in FIG. 9, when the imaging devices 120 and 121 are located at positions relatively close to the ground surface 10, the imaging devices 120 and 121 may be cameras that produce wide-angle images, e.g., fish-eye cameras. Even if there are large image distortions, internal parameters of the cameras may be set appropriately to enable conversion of the captured images into plan view images.

Figure 19:
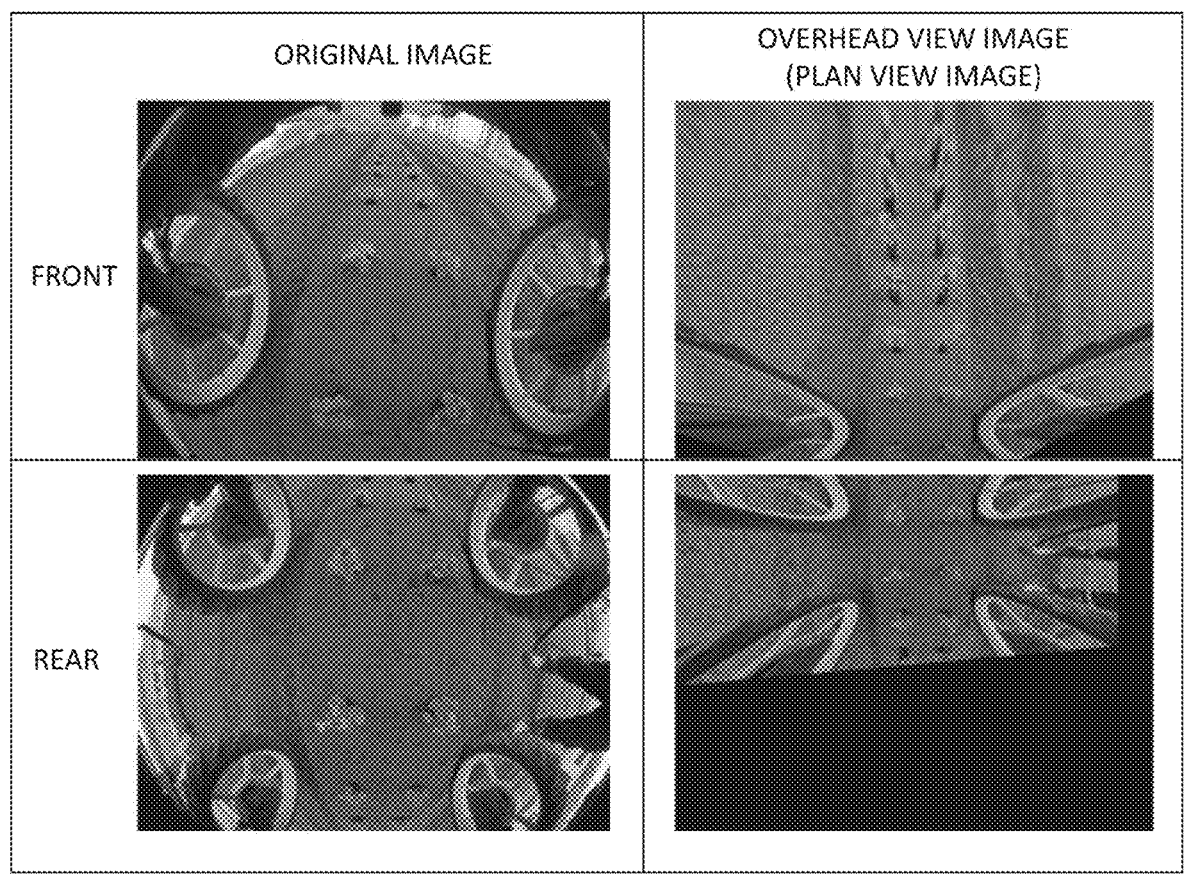
FIG. 19 is a diagram showing examples of a first image, a second image, a first plan view image, and a second plan view image.

FIG. 19 is a diagram showing examples of a first image, a second image, a first plan view image, and a second plan view image. In FIG. 19, the first image is depicted in an upper left diagram, the second image is depicted in a lower left diagram, the first plan view image is depicted in an upper right diagram, and the second plan view image is depicted in a lower right diagram. In this example, the first image shows the front wheels of the agricultural machine 100 and a region of the ground surface located between the front wheels. The second image shows the front wheels and rear wheels of the agricultural machine 100 and a region of the ground surface located between the front wheels and the rear wheels. The processor 122 converts the first image and the second image into the first plan view image and the second plan view image as shown on the right side of FIG. 19. Common subjects (i.e., the front wheels and the ground surface and the crops in between) are included in a lower portion of the first plan view image and in an upper portion of the second plan view image. These portions are the overlap region.

FIG. 17 is referred to again. At step S130, based on the position of each front wheel and the position of each rear wheel in the second plan view image, the processor 122 selects a region of interest from the first plan view image. Specifically, the processor 122 performs the process described with reference to FIG. 7 and the like, and selects the region of interest ROI, e.g., as illustrated in FIG. 8, from the first plan view image.

In the present example embodiment, when generating a composite image, the processor 122 can interpolate pixel values in the overlap region from the first plan view image and the second plan view image. Note that generation of the composite image may be omitted.

Figure 20:
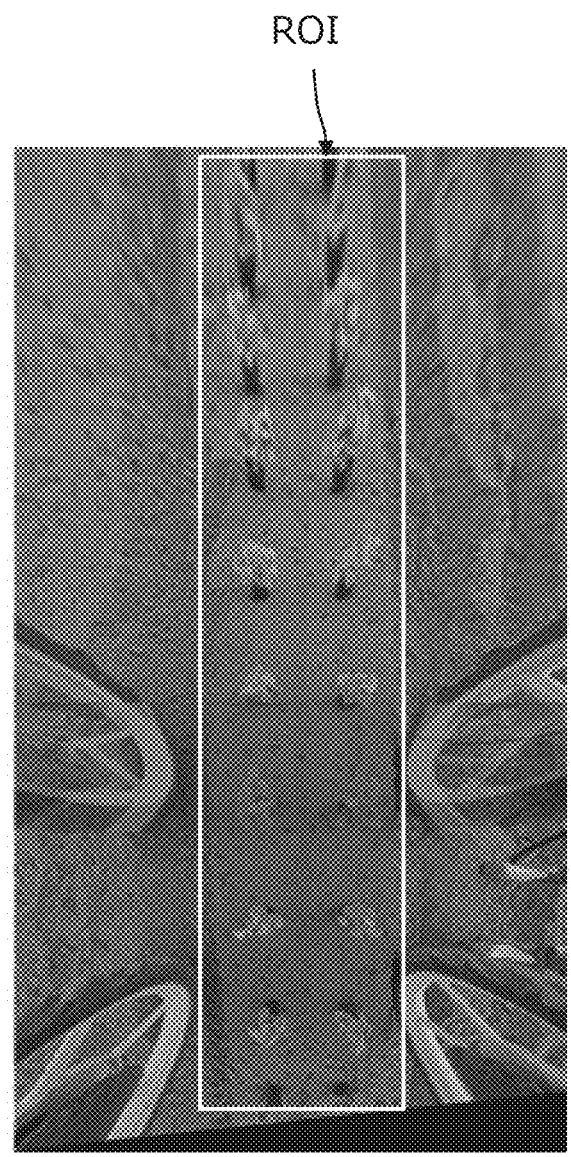
FIG. 20 is a diagram showing an example of a composite image generated in the example of FIG. 19.

FIG. 20 is a diagram showing an example of a composite image generated in the example of FIG. 19. FIG. 20 demarcates the region of interest ROI. The region of interest ROI in this example is extended so as to appear in not only the first plan view image but also the second plan view image obtained after merging. By detecting a crop row based on such a composite image, even in the presence of a missing crop, for example, an approximation line of the crop row can be calculated more accurately.

Now, an example of a calibration operation for determining the aforementioned transformation matrix will be described. The calibration is performed based on two images acquired by imaging a specific subject on the ground surface with the imaging devices 120 and 121. The calibration may be performed before beginning the use of the agricultural machine 100, or when the positions or orientations of the imaging devices 120 and 121 have deviated from their initial states. During the calibration, the processor 122 performs operations S1, S2 and S3 as follows.

(S1) acquire a first reference image that is generated by the first imaging device 120 imaging a specific subject located on the ground surface and a second reference image that is generated by the second imaging device 121 imaging this subject.

(S2) from each of the first reference image and the second reference image, extract a plurality of feature points of the subject.

(S3) based on a relationship between the positions of the plurality of feature points in the first reference image and the positions of the corresponding plurality of feature points in the second reference image, generate or update the transformation matrix.

The specific subject that is used for the calibration may be a board on which a characteristic pattern is drawn, e.g., a pattern that may be used as an AR (Augmented Reality) marker, for example. Alternatively, a wheel of the agricultural machine 100 may be used as the specific subject. In the following description, the specific subject used in the calibration will be referred to as the "calibration subject".

Figure 21:
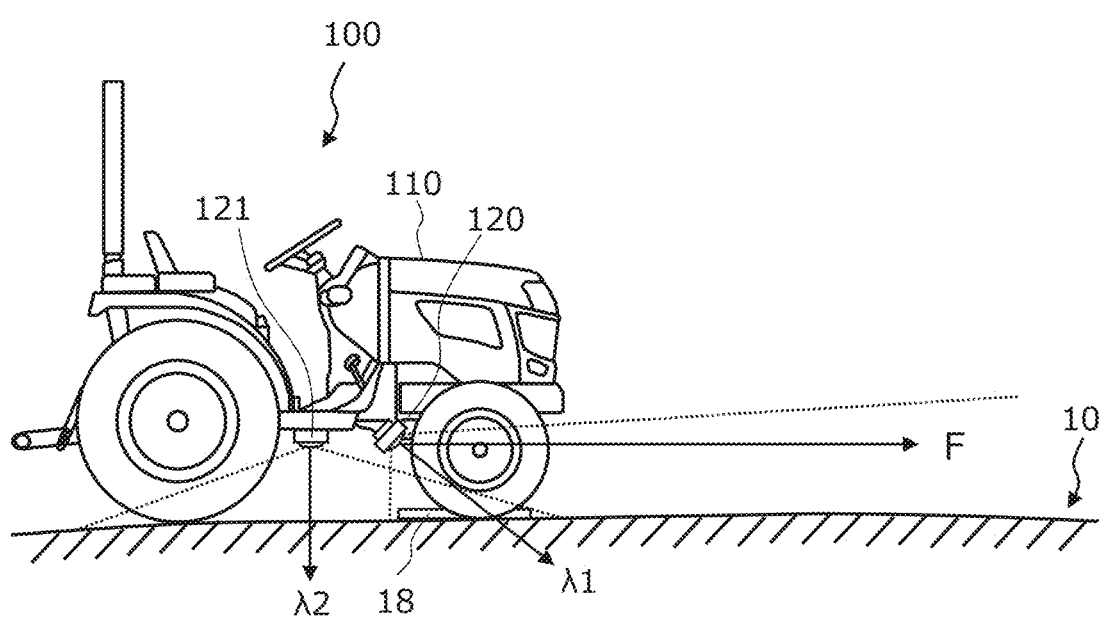
FIG. 21 is a diagram showing how a calibration subject that is placed on the ground surface may be imaged by two imaging devices.

FIG. 21 is a diagram showing how a calibration subject 18 that is placed on the ground surface 10 may be imaged by the imaging devices 120 and 121. In this example, the calibration subject 18 is a board with a number of marks drawn thereon in characteristic patterns, and is placed between the two front wheels of the agricultural machine 100. While the agricultural machine 100 is stopped, the first imaging device 120 and the second imaging device 121 are used to image the ground surface together with the calibration subject 18 placed thereon, and respectively generate the first reference image and the second reference image.

Figure 22:
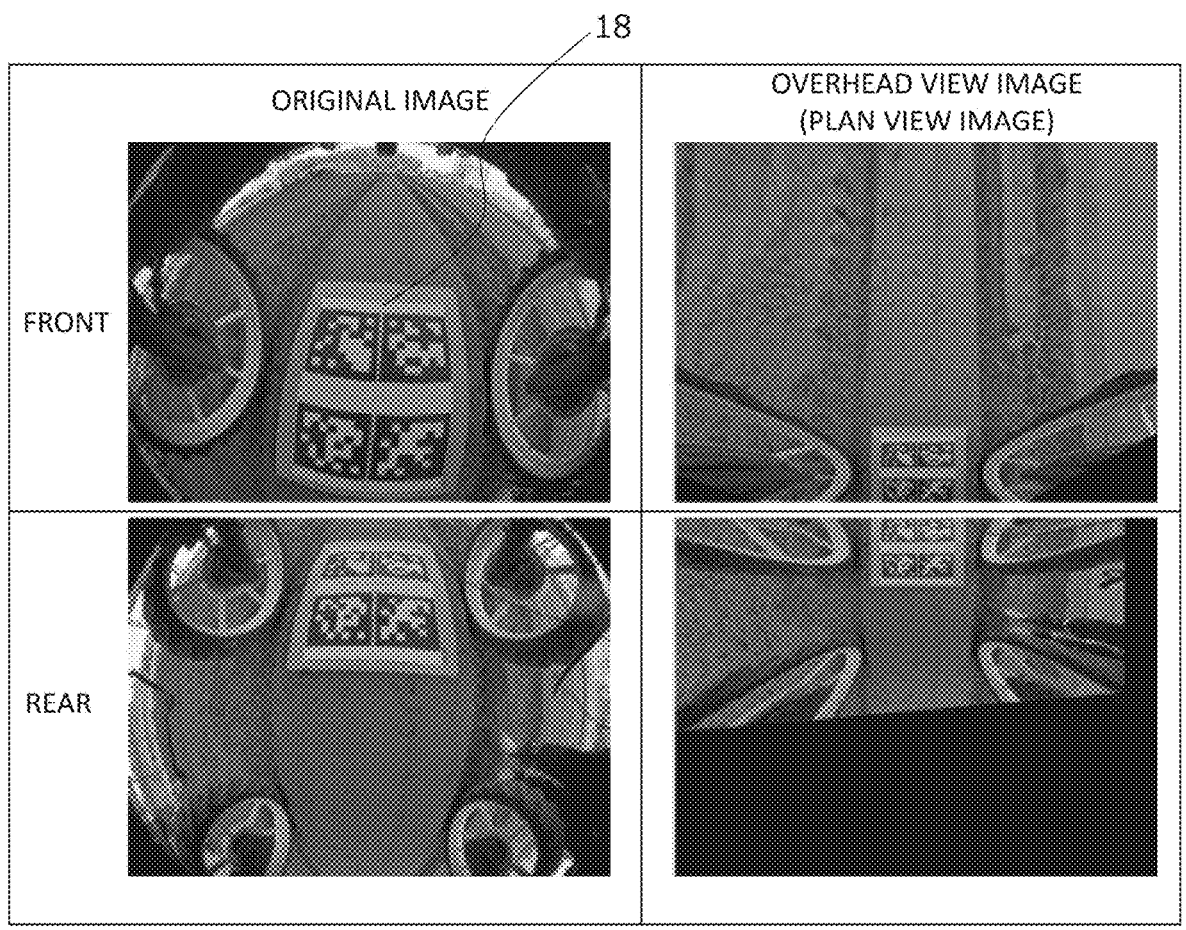
FIG. 22 is a diagram showing examples of images that are obtained by imaging a calibration subject.

FIG. 22 is a diagram showing examples of images that are obtained by imaging the calibration subject 18. By imaging the calibration subject 18, the first imaging device 120 generates the first reference image, e.g., as shown in the upper left portion of FIG. 22. By imaging the calibration subject 18, the second imaging device 121 generates the second reference image, e.g., as shown in the lower left portion of FIG. 22. From each of the first reference image and the second reference image, the processor 122 detects a plurality of feature points (e.g., four corners of the board, or a corner(s) of each of the four marks) in the calibration subject 18, and calculates a transformation matrix based on their positions.

An example of a plan view image that has been converted from the first reference image is shown in an upper right diagram of FIG. 22. An example of a plan view image that has been converted from the second reference image is shown in a lower right diagram of FIG. 22. By overlaying the plurality of feature points of the calibration subject 18 in these plan view images, the processor 122 determines a range corresponding to the overlap region, and records this information to the storage. In the following merging process, merging is performed based on the recorded information.

FIG. 17 is referred to again. At step S140, based on the composite image, the processor 122 detects a crop row on the ground surface. For example, from the composite image, the processor 122 may generate a composite enhanced image in which the color (e.g., green) of the crop row is enhanced, and detect edge lines of a crop row on the ground surface based on the composite enhanced image.

At step S150, the processor 122 determines an approximation line of the detected crop row. The processor 122 may determine a line that passes through the midpoint between the edge lines of the detected crop row at its both ends as an approximation line, for example.

At step S160, along the approximation line, the processor 122 determines a target path for the agricultural machine 100 in the vehicle coordinate system. The target path may be determined so as to overlap the approximation line of the crop row, for example. Note that the target path may be set in parallel to the approximation line of the crop row or ridge and at a predetermined distance from the approximation line. The processor 122 outputs information of the determined target path to the automatic steering device 124 of the agricultural machine 100. The automatic steering device 124 performs steering control for the agricultural machine 100 so that the agricultural machine 100 travels along the target path.

Now, a specific example of a method of detecting a crop row at step S140 will be described. Once the composite image is generated, the processor 122 can detect a crop row from the composite image by performing operations S1, S2 and S3 below.

(S1) from the composite image, generate a composite enhanced image in which the color of a crop row to be detected is enhanced.

(S2) from the composite enhanced image, generate a binary image that is classified into first pixels of which a color index value for the crop row is equal to or greater than a threshold and second pixels of which this index value is below the threshold.

(S3) based on index values of the first pixels, determine the positions of edge lines of the crop row.

Hereinafter, specific examples of operations S1, S2 and S3 will be described.

Rows of crops (crop rows) appear in the composite image shown in FIG. 20, which are planted in the form of rows on the ground surface of a field. In this example, the rows of crops are arranged essentially in parallel and at equal intervals on the ground surface.

In operation S1, based on the composite image, the processor 122 generates a composite enhanced image in which the color of a crop row for detection is enhanced. Crops perform photosynthesis with sunlight (white light), and therefore contain chlorophyll. Chlorophyll has a lower optical absorption rate for green than for red or blue. Therefore, the spectrum of sunlight that is reflected by a crop shows a relatively high value in the green wavelength range, as compared to the spectrum of sunlight that is reflected from the soil surface. As a result, the crop color generally includes plenty of green components, and thus a typical example of the "color of the crop row" is green. However, as will be described below, the "color of the crop row" is not limited to green.

In the case where the color of a crop row for detection is green, an enhanced image in which the color of a crop row is enhanced is an image resulting from: converting the RGB values of each pixel of a color image into pixel values having a relatively large weight on the G value. Such pixel value conversion for generating an enhanced image may be defined as "(2×G value−R value−B value)/(R value+G value+B value)", for example. Herein, the (R value+G value+B value) in the denominator is a factor for normalization. Hereinafter, normalized RGB values will be referred to as rgb values, which are defined as: r=R value/(R value+G value+B value); g=G value/(R value+G value+B value); and b=B value/(R value+G value+B value). Note that "2×g−r−b" is called an excess green index (ExG: Excess Green Index).

Figure 23:
FIG. 23 is a diagram showing a composite enhanced image resulting from converting the RGB values of the composite image shown in FIG. 20 into "2×g−r−b".

FIG. 23 is a diagram showing a composite enhanced image resulting from converting the RGB values of the composite image shown in FIG. 20 into "2×g−r−b". Through this conversion, in the composite image of FIG. 20, any pixel whose "r+b" is smaller than g is displayed brighter, and any pixel whose "r+b" is larger than g is displayed darker. Through this conversion, an image (composite enhanced image) in which the color of a crop row for detection (i.e., "green" in this example) is enhanced is obtained. Any pixel which is relatively bright in the image of FIG. 23 is a pixel having a relatively large green component, and belongs to the crop region.

As the "color index value" regarding which the color of the crop is to be enhanced, any index other than the excess green index (ExG) may also be used, e.g., a green red vegetation index (G value−R value)/(G value+R value). In the case where the imaging device can also function as an infrared camera, NDVI (Normalized Difference Vegetation Index) may be used as the "color index value for the crop row".

There may be cases where each crop row is covered by a sheet called "mulch" (mulching sheet). In such cases, the "color of the crop row" is the "color of objects that are arranged in rows covering the crops". Specifically, when the sheet color is black, which is an achromatic color, the "color of the crop row" means "black". When the sheet color is red, the "color of the crop row" means "red". Thus, the "color of the crop row" may mean not only the color of the crops themselves, but also the color of the region defining the crop row (i.e., a color that is distinguishable from the color of the soil surface).

The generation of an enhanced image in which the "color of the crop row" is enhanced may utilize conversion from an RGB color space into an HSV color space. An HSV color space is a color space that includes the three components of hue, saturation, and value. Using color information obtained by converting from an RGB color space into an HSV color space makes it possible to detect a "color" with low saturation, such as black or white. In the case of utilizing an OpenCV library to detect "black", the hue may be set to the maximum range (0-179), the saturation may be set to the maximum range (0-255), and the value range may be set to 0-30. In order to detect "white", the hue may be set to the maximum range (0-179), the saturation may be set to the maximum range (0-255), and the value range may be set to 200-255. Any pixel that has a hue, a saturation, and a value falling within such setting ranges is a pixel having the color to be detected. In the case of detecting a green pixel, for example, the hue range may be set to a range of, e.g., about 30-90.

Generating a composite enhanced image in which the color of a crop row for detection is enhanced makes it easy to distinguish (i.e., extract) crop row regions from the remaining background regions (segmentation).

Next, operation S2 will be described.

Figure 24:
FIG. 24 is a diagram showing an example of a binary image obtained through binarization of the composite enhanced image shown in FIG. 23.

In operation S2, from the composite enhanced image, the processor 122 generates a binary image being classified into first pixels of which a color index value for the crop row is equal to or greater than a threshold and second pixels of which this index value is below the threshold. FIG. 24 shows an example of a binary image.

Figure 25:
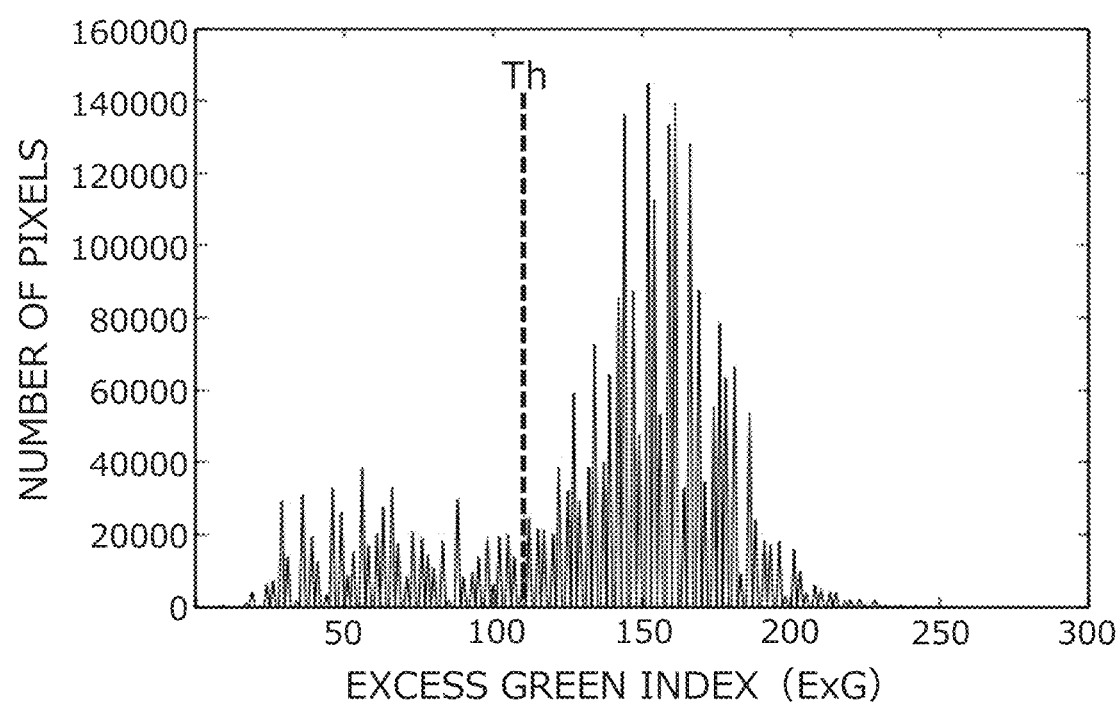
FIG. 25 is a histogram of an excess green index (ExG) in the composite enhanced image shown in FIG. 23.

In the present example embodiment, as a color index value for the crop row, the aforementioned excess green index (ExG) is adopted, and a discriminant analysis method (Otsu's binarization) is used to determine a discrimination threshold. FIG. 25 is a histogram of an excess green index (ExG) in the composite enhanced image shown in FIG. 23. In the histogram, the horizontal axis represents the excess green index (ExG), and the vertical axis represents the number of pixels in the image (corresponding to frequency of occurrence). In FIG. 25, a broken line is shown indicating a threshold Th that is calculated by the discriminant analysis algorithm. Against this threshold Th, the pixels in the composite enhanced image are classified into two class. The right side of the broken line indicating the threshold Th shows the frequency of occurrence of pixel whose excess green index (ExG) is equal to or greater than the threshold, these pixels being estimated as belonging to a crop class. On the other hand, the left side of the broken line indicating the threshold Th shows the frequency of occurrence of pixels whose excess green index (ExG) is below the threshold, these pixels being estimated as belonging to a non-crop class, e.g., the soil. In this example, the first pixels, i.e., the pixels whose index value is equal to or greater than the threshold, correspond to "crop pixels". On the other hand, the second pixels, whose index value is below the threshold, correspond to "background pixels". The background pixels correspond to objects other than those for detection, e.g., the soil surface, and the aforementioned intermediate regions (work paths) 14 may include background pixels. Note that the method of threshold determination is not limited to the above examples; for example, other methods utilizing machine learning may be used to determine the threshold.

By assigning each of the pixels of the composite enhanced image as either a "first pixel" or a "second pixel", it becomes possible to extract a region for detection from the composite enhanced image. Also, by giving "zero" to the pixel value of any "second pixel", or removing the second pixel data from the image data, it becomes possible to mask any region other than the regions for detection. When finalizing the regions to be masked, it may be possible to perform a process of including any pixel whose excess green index (ExG) exhibits a locally high value, as a noise, into the masked regions.

Through such processing, a binary image which is classified into first pixels and second pixels as shown in FIG. 20 can be generated.

Next, operation S3 will be described.

In operation S3, based on the index values of the first pixels in the binary image, the processor 122 determines the positions of the edge lines of the crop row 12.

Figure 26:
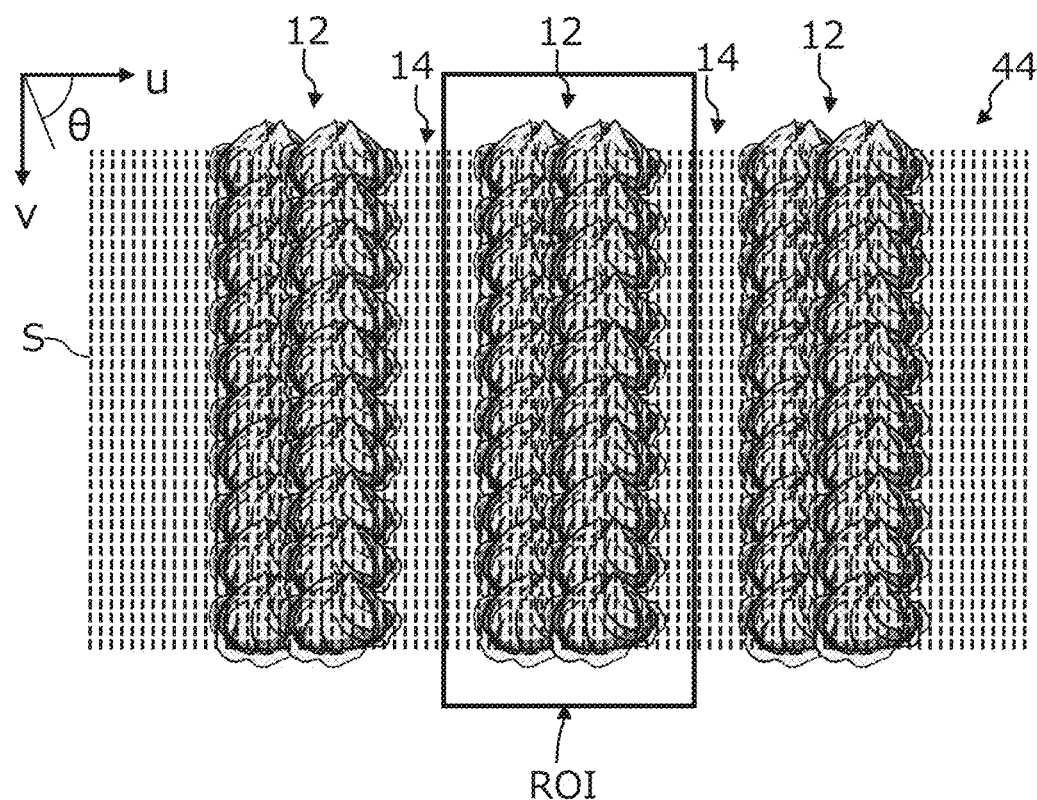
FIG. 26 is a diagram schematically showing an example of an image in which three crop rows appear.

FIG. 26 is a diagram schematically showing an example of an image 44 in which three crop rows 12 appear in the first plan view image. In this example, the directions of the crop rows 12 are parallel to the vertical direction in the image (v axis direction). FIG. 26 shows a multitude of scanning lines (broken line) S that are parallel to the vertical direction in the image (v axis direction). The processor 122 totals the index values of pixels that are located on the plurality of scanning lines S in the region of interest ROI to obtain a total value for each scanning line S.

Figure 27:
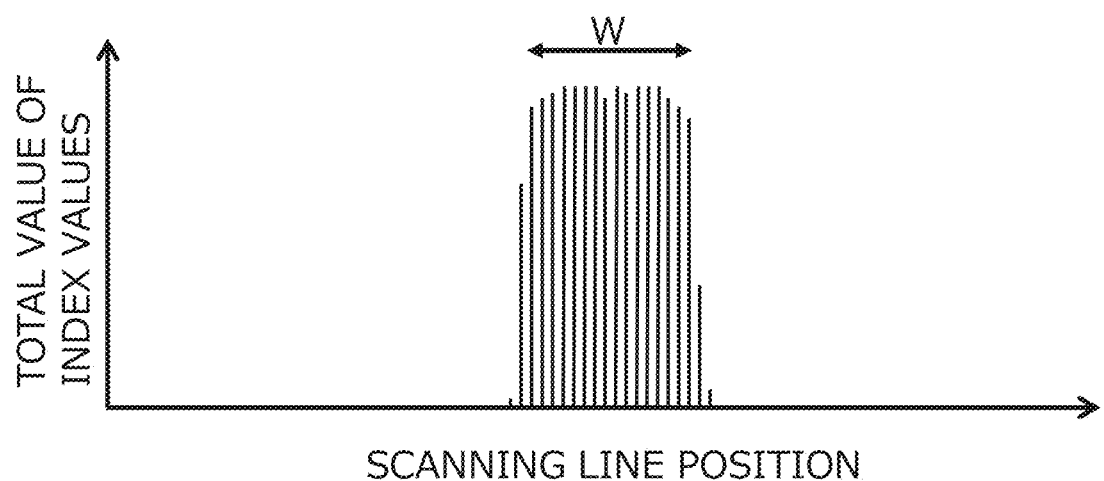
FIG. 27 is a diagram schematically showing a relationship between positions of scanning lines and total values of index values obtained with respect to the image shown in FIG. 26.

FIG. 27 is a diagram schematically showing a relationship between positions of scanning lines S in the region of interest ROI and total values of index values, as obtained with respect to the image 44 shown in FIG. 26. In FIG. 27, the horizontal axis represents the positions of scanning lines S along the horizontal direction in the image (u axis direction). In the image 44, when many of the pixels that are crossed by a scanning line S are first pixels belonging to a crop row 12, that scanning line S has a large total value. On the other hand, when many of the pixels that are crossed by a scanning line S are second pixels (background pixels) belonging to an intermediate region (work path) 14 existing between crop rows 12, that scanning line S has a small total value. Note that, in the present example embodiment, the intermediate regions (work paths) 14 are masked, so that the second pixels have an index value of zero.

In the example of FIG. 27, there exist concave regions whose total value is zero or near-zero, and convex regions that are distinguished by such concave regions. The concave regions correspond to intermediate regions (work paths) 14, whereas the convex regions correspond to crop rows 12. In the present example embodiment, the positions of scanning lines S having total values at predetermined positions on opposite sides of a peak of total values within a convex region, specifically, those which accounts for a predetermined rate (e.g., a value chosen in a range from about 60% to about 90%) with respect to the peak of total values, are determined as the positions of edge lines of a crop row 12. Both ends of an arrow W in FIG. 27 indicate the positions of edge lines of each crop row 12. In the example of FIG. 27, the positions of the edge lines of each crop row 12 are positions of scanning lines S having an approximately 80% value of a peak of total values of the crop row 12.

In the present example embodiment, even when the first plan view image includes a plurality of crop rows, computation only needs to be performed for the region of interest ROI, whereby the computational load is reduced.

Figure 28:
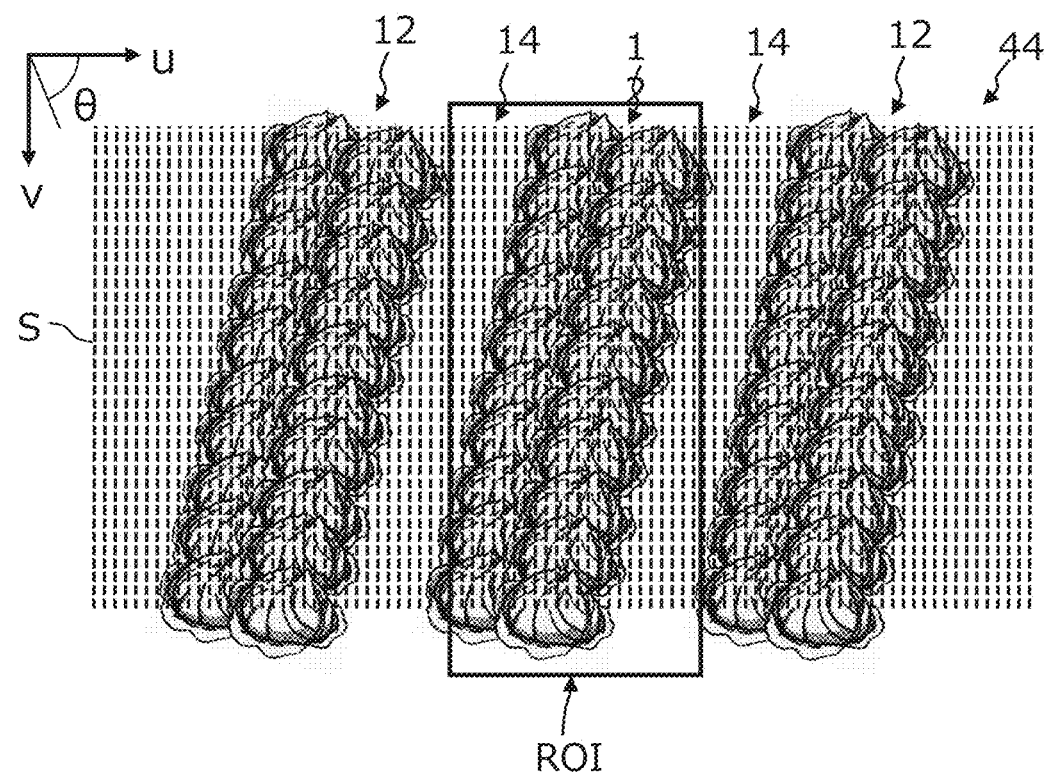
FIG. 28 is a diagram showing an example of an image in which crop rows extend obliquely.

FIG. 28 shows an example of a binary image 44 in which a plurality of crop rows 12 extend obliquely in the first plan view image. Depending on the orientation of the agricultural machine 100, the crop rows 12 may extend in directions that are inclined right or left in the images acquired by the imaging devices 120 and 121. If a plan view image is generated from such an image through homography transformation, as in the example of FIG. 28, the direction of the crop rows 12 will be inclined from the vertical direction in the image (v axis direction).

Figure 29:
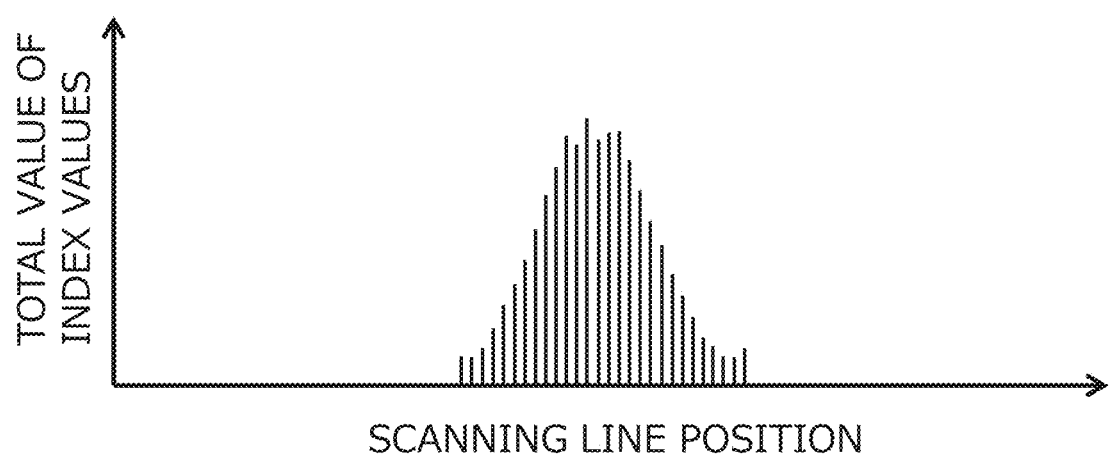
FIG. 29 is a diagram schematically showing a relationship between positions of scanning lines and total values of index values obtained with respect to the image shown in FIG. 28.

FIG. 28 also shows a multitude of scanning lines (broken line) S that are parallel to the vertical direction in the image (v axis direction). The processor 122 totals the index values of pixels that are located on such a plurality of scanning lines S to obtain a total value for each scanning line S. FIG. 29 is a diagram schematically showing a relationship between positions of scanning lines S and total values of index values, as obtained with respect to the image 44 shown in FIG. 28.

Figure 30:
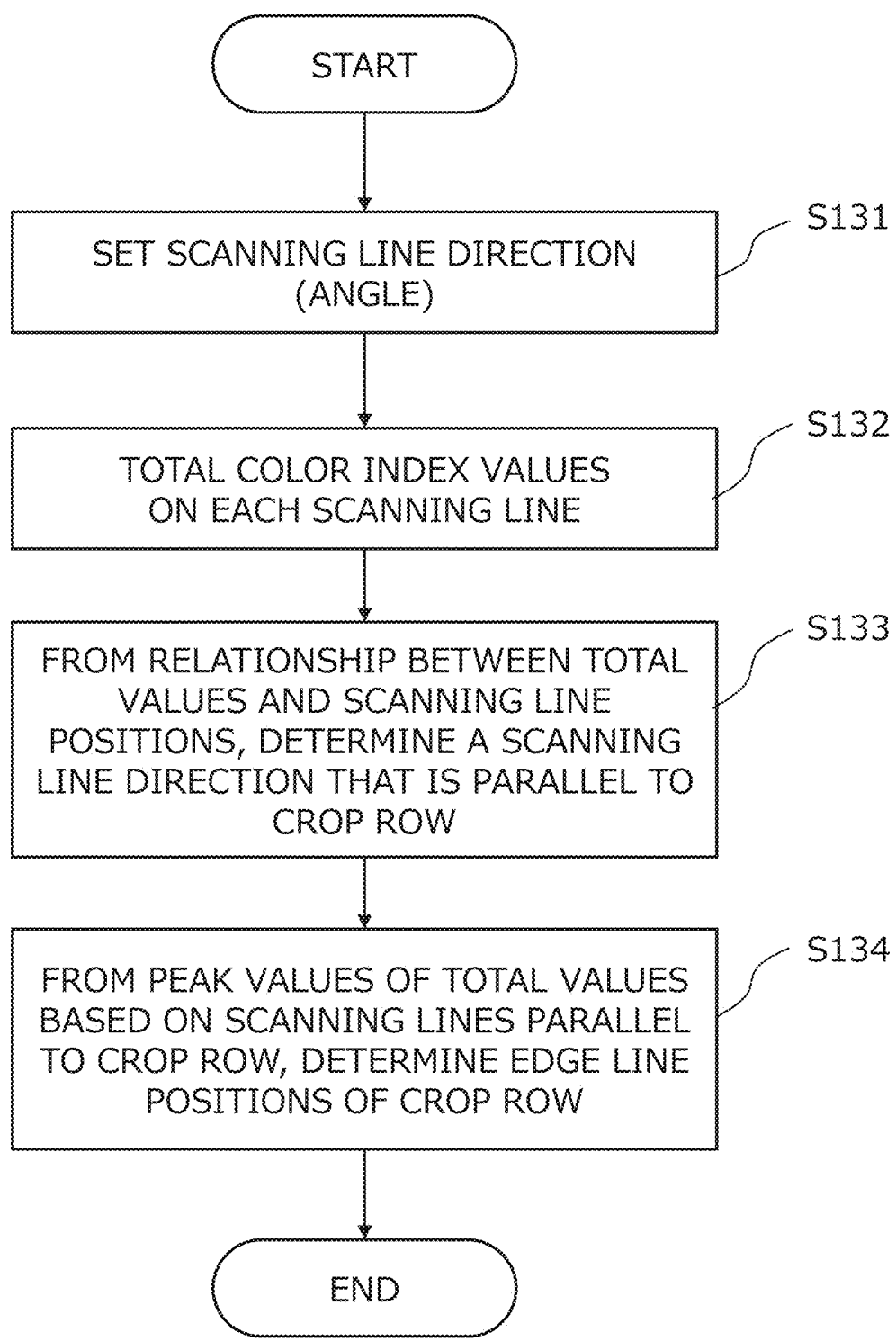
FIG. 30 is a flowchart showing an example procedure of, by varying the direction of scanning lines, searching for a direction of scanning lines that is parallel to the direction of crop rows.

By varying the direction (angle) of scanning lines S, the processor 122 searches for a direction of scanning lines S that is parallel to the direction of the crop rows 12. FIG. 30 is a flowchart showing an example of a method of searching for a direction of scanning lines S that is parallel to the direction of the crop rows 12.

At step S131, a direction (angle) of the scanning lines S is set. Herein, clockwise angles θ are defined relative to the u axis of the image coordinate system (see FIG. 26 and FIG. 28). The search through angles θ may be done by setting a range of e.g., 60 to 120 degrees and using angle variations of 1 degree, for example. In this case, at step S131, 60, 61, 62, . . . , 119 and 120 degrees are given as the angle θ of scanning lines S.

At step S132, index values are totaled for the pixels on any scanning line S extending in the direction of each angle θ to obtain data of a distribution of total values across a direction perpendicular to the scanning lines. This data will exhibit a different distribution depending on the angle θ.

At step S133, from among the data of distributions of total values regarding a plurality of directions thus obtained, a distribution is selected that has steep boundaries between bumps and dents, e.g., as shown in FIG. 27, such that the crop rows 12 are most clearly distinguishable from the intermediate regions 14, and the angle θ of scanning lines S that is conducive to that distribution is determined.

At step S134, from the peak values of the distribution corresponding to the angle θ determined at step S133, edge lines of each crop row 12 are determined. As described above, positions of scanning lines S having a total value that is about 0.8 times the peak, for example, may be adopted as the edge lines.

Note that, when searching through directions (angles) of the scanning lines S, each time the angle θ is varied by about 1 degree within the range of search, a distribution of total values on the scanning lines S at that angle θ may be determined. A feature (e.g., recess depth/protrusion height, a differential value of the envelope, etc.) may be calculated from the waveform of the distribution of total values, and based on that feature, it may be determined whether the direction of the crop rows 12 is parallel to the direction of the scanning lines S or not.

Note that the method of determining the angle θ is not limited to the above examples. In the case where the direction in which the crop rows extend is known through measurements, the direction of the agricultural machine may be measured with an IMU mounted on the agricultural machine 100, and its angle θ with respect to the direction in which the crop rows extend may be determined.

The computational load for determining the aforementioned angle θ is also reduced because only processing for the region of interest ROI in the first plan view image needs to be performed.

With the above method, crop row detection with high accuracy is possible by reducing or preventing the influences of forward light, backlight, sunny weather, cloudy weather, fog, and other weather conditions, or daylighting conditions that vary depending on the time zone of work. Moreover, crop row detection with high robustness is possible even when there is a change in the kind of crop (cabbage, broccoli, radish, carrot, lettuce, Chinese cabbage, etc.), growth state (from seedling to fully grown), presence/absence of diseases, presence/absence of fallen leaves or weeds, and soil color.

In the above example embodiment, the processor 122 generates a composite image of the first plan view image and the second plan view image that have been generated through homography transformation from the first image and the second image, thereafter determines a binarization threshold for the composite image, and extracts a crop region as pixels whose index values are equal to or greater than the threshold. Instead of this method, the processor 122 may detect a crop row by performing operations S11 to S16 below.

(S11) from the first image, generate a first enhanced image in which the color of a crop row is enhanced.

(S12) from the second image, generate a second enhanced image in which the color of a crop row is enhanced.

(S13) from the first enhanced image, generate a first plan view image as viewed from above the ground surface that is classified into pixels of which a color index value for the crop row is equal to or greater than a threshold and pixels of which this index value is below the threshold.

(S14) from the second enhanced image, generate a second plan view image as viewed from above the ground surface that is classified into pixels of which a color index value for the crop row is equal to or greater than a threshold and pixels of which this index value is below the threshold.

(S15) determine a region of interest based on the second plan view image.

(S16) detect a crop row on the ground surface based on the first plan view image and second plan view image.

With this method, a first plan view image and a second plan view image in which the crop row regions are enhanced are generated, and from these images, a region of interest containing a crop row is selected. With such a method, too, as in the above-described method, a crop row can be detected with a high accuracy.

Although the above example illustrates that a crop row is detected from the composite image, it is also possible to detect a ridge from the composite image. In order to detect a ridge, a ToF (Time of Flight) technique may be used to acquire three-dimensional information (bumps-and-dents information) of the ground surface. In that case, too, the computational load can be reduced by using the three-dimensional information within the region of interest.

The aforementioned method of detecting a crop row or ridge is described in detail in PCT publication No. WO2023/276227. The entire disclosure of WO2023/276227 is incorporated herein by reference.

Methods of detecting a crop row or ridge that is made in a field are not limited to the above-described examples; rather, a wide variety of known algorithms may be applied. For example, a method of linearly approximating a crop row is described in detail in Japanese Patent No. 2624390, to which the Applicants are entitled. The entire disclosure of Japanese Patent No. 2624390 is incorporated herein by reference. A method of detecting lines that are created by stepped portions of ridges or trenches is described in Japanese Laid-Open Patent Publication No. 2016-146061. The entire disclosure of Japanese Laid-Open Patent Publication No. 2016-146061 is incorporated herein by reference.

Next, an example configuration of the agricultural machine will be described.

The agricultural machine includes the above-described row detection system and a control system to perform control to achieve auto-steer driving. The control system is a computer system that includes a storage and a controller, and is configured or programmed to control steering, travel, and other operations of the agricultural machine.

In a usual automatic steering operation mode, the controller may be configured or programmed to identify the position of the agricultural machine by using the positioning device, and, based on a target path which has been generated in advance, control the steering of the agricultural machine so that the agricultural machine travels along the target path. Specifically, it may control the steering angle of the wheels responsible for steering (e.g., the front wheels) of the agricultural machine so that the work vehicle travels along the target path within the field. The agricultural machine according to the present example embodiment includes an automatic steering device which performs not only such a usual automatic steering mode, but also travel under "row-following control" within any field in which rows of crops or ridges are made.

The positioning device includes a GNSS receiver, for example. Such a positioning device is able to identify the position of the work vehicle based on signals from GNSS satellites. However, when there are rows in the field, even if the positioning device is able to measure the position of the agricultural machine with a high accuracy, the interspaces between rows are narrow, such that the traveling equipment, e.g., wheels, of the agricultural machine may be liable to protrude into the rows depending on how the crops are planted or depending on the state of growth. In the present example embodiment, however, the aforementioned row detection system can be used to detect actually-existing rows and perform appropriate automatic steering. In other words, the automatic steering device included in the agricultural machine according to an example embodiment of the present disclosure is configured to control the steering angle of the wheels responsible for steering based on the positions of the edge lines of a row that are determined by the row detection system.

Moreover, in the agricultural machine according to the present example embodiment, the processor of the row detection system can monitor the positional relationship between the edge lines of rows and the wheels responsible for steering on the basis of time-series color images. By generating a positional error signal from this positional relationship, it becomes possible for the automatic steering device of the agricultural machine to appropriately adjust the steering angle so as to reduce the positional error signal.

Figure 31:
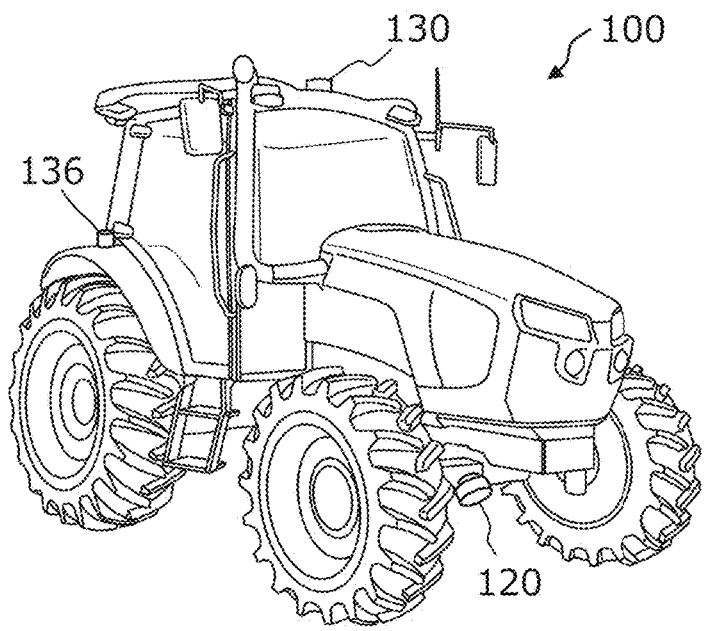
FIG. 31 is a perspective view showing an example appearance of the agricultural machine.
Figure 32:
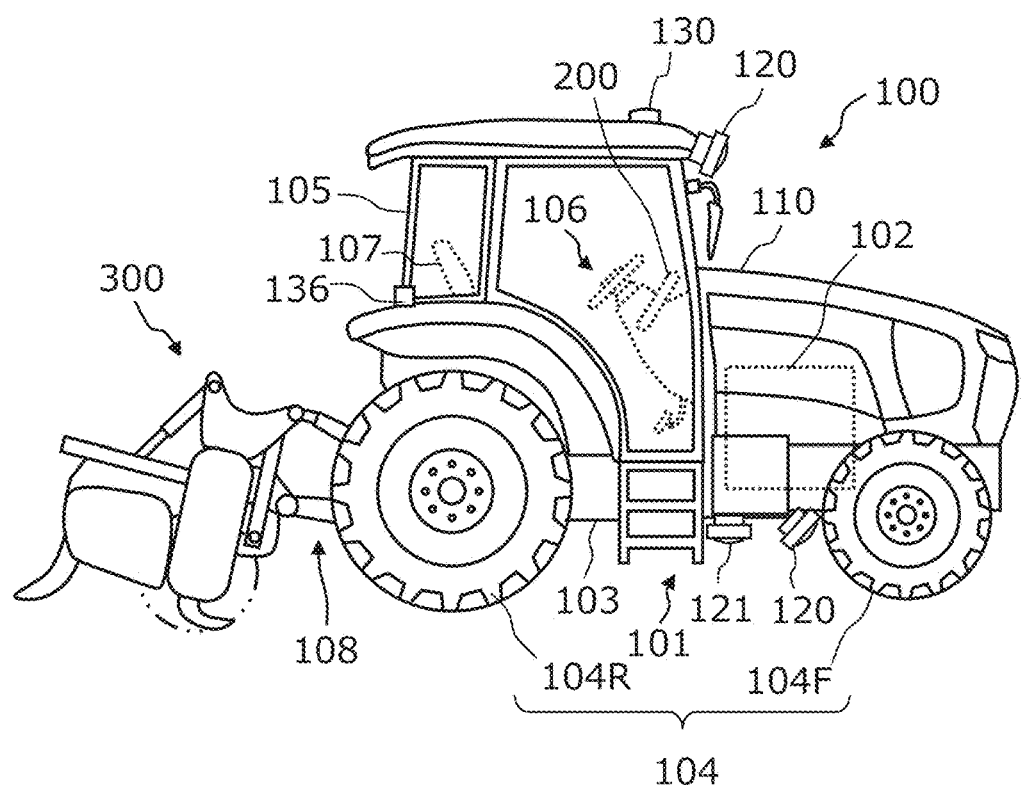
FIG. 32 is a side view schematically showing an example of the agricultural machine to which an implement is attached.

FIG. 31 is a perspective view showing an example appearance of the agricultural machine 100 according to the present example embodiment. FIG. 32 is a side view schematically showing an example of the agricultural machine 100 to which an implement 300 is attached. The agricultural machine 100 according to the present example embodiment is an agricultural tractor (work vehicle) having the implement 300 attached thereto. The agricultural machine 100 is not limited to a tractor, and does not need to have the implement 300 attached thereto. The row detection techniques according to the present disclosure can exhibit excellent effects when used in small-sized crop management machines and vegetable transplanters that may be used for tasks associated with the interridge land, such as ridge making, intertillage, ridging, weeding, side dressing, and preventive pest control, for example.

The agricultural machine 100 according to the present example embodiment includes imaging devices 120 and 121 and an obstacle sensor(s) 136. Although one obstacle sensor 136 is illustrated in FIG. 31, obstacle sensors 136 may be provided at a plurality of positions of the agricultural machine 100.

As shown in FIG. 32, the agricultural machine 100 includes a vehicle body 110, a prime mover (engine) 102, and a transmission 103. On the vehicle body 110, tired wheels 104 and a cabin 105 are provided. The wheels 104 include a pair of front wheels 104F and a pair of rear wheels 104R. Inside the cabin 105, a driver's seat 107, a steering device 106, an operational terminal 200, and switches for manipulation are provided. Either the front wheels 104F or the rear wheels 104R may be replaced by a plurality of wheels with tracks attached thereon (crawlers), rather than a tired wheel (s). The agricultural machine 100 is a four-wheel drive vehicle including four wheels 104 as driving wheels, or a two-wheel drive vehicle including a pair of front wheels 104F or a pair of rear wheels 104R as driving wheels.

The positioning device 130 in the present example embodiment includes a GNSS receiver. The GNSS receiver includes an antenna to receive a signal(s) from a GNSS satellite(s) and a processing circuit to determine the position of the agricultural machine 100 based on the signal(s) received by the antenna. The positioning device 130 receive a GNSS signal(s) transmitted from a GNSS satellite(s), and performs positioning on the basis of the GNSS signal(s). GNSS is a general term for satellite positioning systems, such as GPS (Global Positioning System), QZSS (Quasi-Zenith Satellite System, e.g., MICHIBIKI), GLONASS, Galileo, BeiDou, and the like. Although the positioning device 130 in the present example embodiment is disposed above the cabin 105, it may be disposed at any other position.

Furthermore, the positioning device 130 may complement the position data by using a signal from an IMU. The IMU can measure tilts and minute motions of the agricultural machine 100. By complementing the position data based on the GNSS signal using the data acquired by the IMU, the positioning performance can be improved.

In the examples shown in FIGS. 31 and 32, the obstacle sensor(s) 136 is provided at the rear of the vehicle body 110. The obstacle sensor(s) 136 may be disposed at any other position than the rear of the vehicle body 110. For example, one or more obstacle sensors 136 may be disposed at any position selected from among the sides of the vehicle body 110, the front of the vehicle body 110, and the cabin 105. The obstacle sensor(s) 136 detects objects around the agricultural machine 100. Each obstacle sensor 136 may include a laser scanner and/or an ultrasonic sonar, for example. When an obstacle exists at a position within a predetermined detection area (search area) from the obstacle sensor 136, the obstacle sensor 136 outputs a signal indicating the presence of an obstacle. A plurality of obstacle sensors 136 may be provided at different positions of the body of the agricultural machine 100. For example, a plurality of laser scanners and a plurality of ultrasonic sonars may be disposed at different positions of the body. Providing a multitude of obstacle sensors 136 can reduce blind spots in monitoring obstacles around the agricultural machine 100.

The prime mover 102 may be a diesel engine, for example. Instead of a diesel engine, an electric motor may be used. The transmission 103 can change the propulsion and moving speed of the agricultural machine 100 through a speed changing mechanism. The transmission 103 can also switch between forward travel and backward travel of the agricultural machine 100.

The steering device 106 includes a steering wheel, a steering shaft connected to the steering wheel, and a power steering device to assist in the steering by the steering wheel. The front wheels 104F are the wheels responsible for steering, such that changing their angle of turn (also referred to as "steering angle") can cause a change in the traveling direction of the agricultural machine 100. During manual steering, the steering angle of the front wheels 104F can be changed as the operator manipulates the steering wheel. The power steering device includes a hydraulic device or an electric motor to supply an assisting force for changing the steering angle of the front wheels 104F. When automatic steering is performed, under the control of a controller disposed in the agricultural machine 100, the steering angle may be automatically adjusted by the power of the hydraulic device or electric motor (steering motor).

A linkage device 108 is provided at the rear of the vehicle body 110. The linkage device 108 may include, e.g., a three-point linkage (also referred to as a "three-point link" or a "three-point hitch"), a PTO (Power Take Off) shaft, a universal joint, and a communication cable. The linkage device 108 allows the implement 300 to be attached to or detached from the agricultural machine 100. The linkage device 108 is able to raise or lower the three-point linkage device with a hydraulic device, for example, thus controlling the position or pose of the implement 300. Moreover, motive power can be sent from the agricultural machine 100 to the implement 300 via the universal joint. While towing the implement 300, the agricultural machine 100 allows the implement 300 to perform a predetermined task. The linkage device may be provided frontward of the vehicle body 110. In that case, the implement may be connected frontward of the agricultural machine 100.

The implement 300 shown in FIG. 32 is a rotary cultivator, for example. The implement 300 to be towed by or attached to a tractor or other work vehicles when traveling in a manner of following rows may be any kind, so long as it is used in operations associated with the interridge land, such as ridge making, intertillage, ridging, weeding, side dressing, and preventive pest control.

Figure 33:
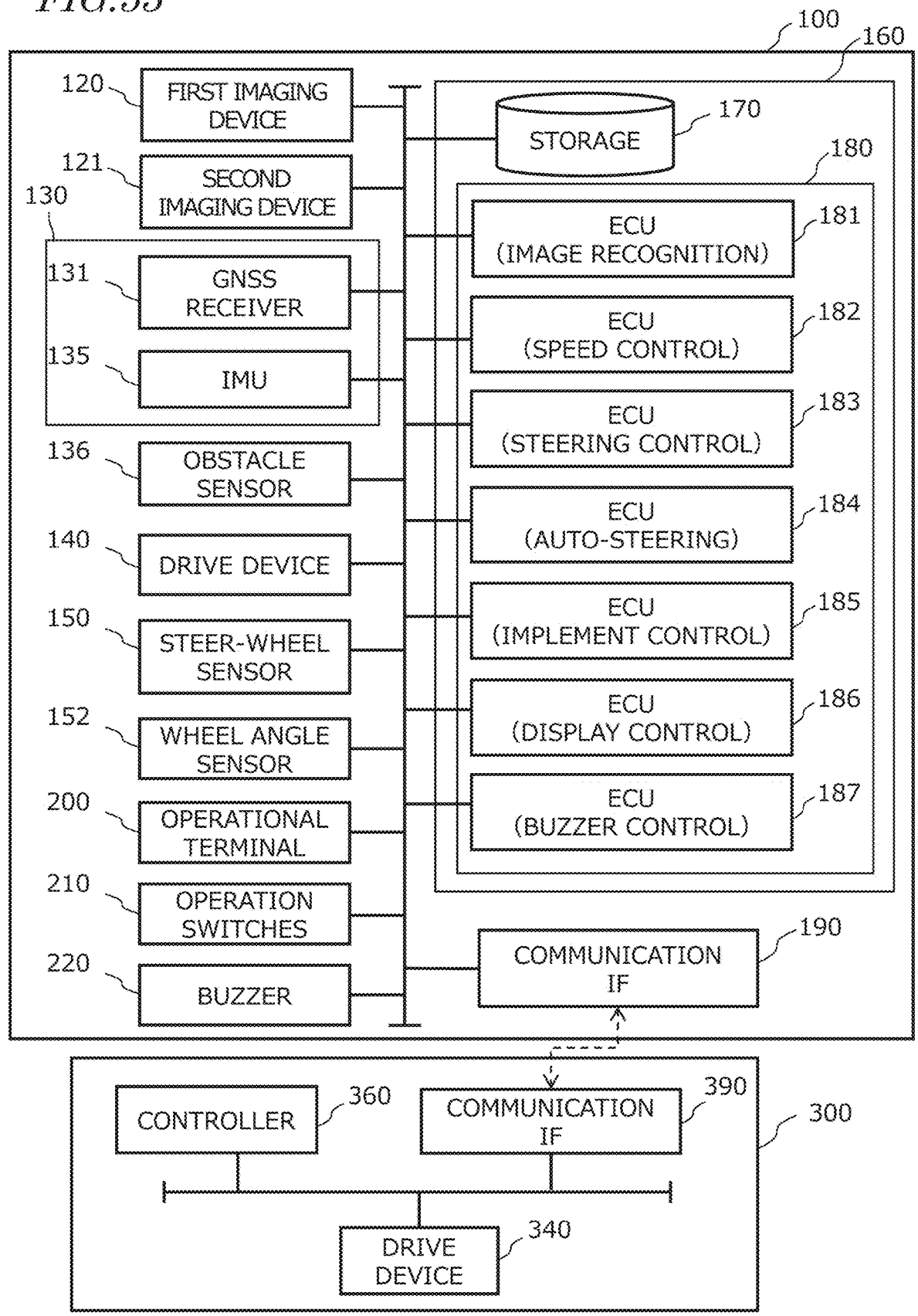
FIG. 33 is a block diagram showing an example of a schematic configuration of an agricultural machine and an implement.

FIG. 33 is a block diagram showing an example of a schematic configuration of the agricultural machine 100 and the implement 300. The agricultural machine 100 and the implement 300 can communicate with each other via a communication cable that is included in the linkage device 108.

In addition to the first imaging device 120, the second imaging device 121, the positioning device 130, the obstacle sensor 136, and the operational terminal 200, the agricultural machine 100 in the example of FIG. 33 includes a drive device 140, a steering wheel sensor 150, an angle-of-turn sensor (wheel angle sensor) 152, a control system 160, a communication interface (IF) 190, operation switches 210, and a buzzer 220. The positioning device 130 includes a GNSS receiver 131, an RTK receiver 122, and an IMU 135. The control system 160 includes a storage 170 and a controller 180. The controller 180 includes a plurality of electronic control units (ECU) 181 to 186. The implement 300 includes a drive device 340, a controller 380, and a communication interface (IF) 390. Note that FIG. 33 shows component elements which are relatively closely related to the operation of automatic steering or self-driving by the agricultural machine 100, while other component elements are omitted from illustration.

The positioning device 130 performs positioning of the agricultural machine 100 by utilizing GNSS. In the case where the positioning device 130 includes a RTK receiver, not only GNSS signals transmitted from multiple GNSS satellites, but also a correction signal that is transmitted from a reference station is used. The reference station may be disposed around the field that is traveled by the agricultural machine 100 (e.g., at a position within about 10 km of the agricultural machine 100). The reference station generates a correction signal based on the GNSS signals received from the multiple GNSS satellites, and transmits the correction signal to the positioning device 130. The GNSS receiver 131 in the positioning device 130 receives the GNSS signals transmitted from the multiple GNSS satellites. Based on the GNSS signals and the correction signal, the positioning device 130 calculates the position of the agricultural machine 100, thus achieving positioning. Use of an RTK-GNSS enables positioning with an accuracy on the order of several cm of errors, for example. Positional information (including latitude, longitude, and altitude information) is acquired through the highly accurate positioning by an RTK-GNSS. Note that the positioning method is not limited to an RTK-GNSS; any arbitrary positioning method (e.g., an interferometric positioning method or a relative positioning method) that provides positional information with the necessary accuracy can be used. For example, positioning may be performed by utilizing a VRS (Virtual Reference Station) or a DGPS (Differential Global Positioning System).

The IMU 135 includes a 3-axis accelerometer and a 3-axis gyroscope. The IMU 135 may include a direction sensor such as a 3-axis geomagnetic sensor. The IMU 135 functions as a motion sensor which can output signals representing parameters such as acceleration, velocity, displacement, and pose of the agricultural machine 100. Based not only on the GNSS signals and the correction signal but also on a signal that is output from the IMU 135, the positioning device 130 can estimate the position and orientation of the agricultural machine 100 with a higher accuracy. The signal that is output from the IMU 135 may be used for the correction or complementation of the position that is calculated based on the GNSS signals and the correction signal. The IMU 135 outputs a signal more frequently than the GNSS signals. Utilizing this highly frequent signal allows the position and orientation of the agricultural machine 100 to be measured more frequently (e.g., about 10 Hz or above). Instead of the IMU 135, a 3-axis accelerometer and a 3-axis gyroscope may be separately provided. The IMU 135 may be provided as a separate device from the positioning device 130.

In addition to or instead of the GNSS receiver 131 and the IMU 135, the positioning device 130 may include other kinds of sensors. Depending on the environment that is traveled by the agricultural machine 100, it is possible to estimate the position and orientation of the agricultural machine 100 with a high accuracy based on data from such sensors.

By using the positioning device 130 as such, it is possible to generate a map of crop rows and ridges as detected by the aforementioned row detection system 1000, 2000.

For example, the drive device 140 may include various devices that are needed for the traveling of the agricultural machine 100 and the driving of the implement 300, e.g., the aforementioned prime mover 102, transmission 103, differential including a locking differential mechanism, steering device 106, and linkage device 108. The prime mover 102 includes an internal combustion engine such as a diesel engine. Instead of an internal combustion engine or in addition to an internal combustion engine, the drive device 140 may include an electric motor that is dedicated to traction purposes.

The steering wheel sensor 150 measures the angle of rotation of the steering wheel of the agricultural machine 100. The angle-of-turn sensor 152 measures the angle of turn of the front wheels 104F, which are the wheels responsible for steering. Measurement values by the steering wheel sensor 150 and the angle-of-turn sensor 152 are used for the steering control by the controller 180.

The storage 170 includes one or more storage media such as a flash memory or a magnetic disc. The storage 170 stores various data that is generated by the sensors and the controller 180. The data that is stored by the storage 170 may include map data in the environment that is traveled by the agricultural machine 100, and data of a target path of automatic steering. The storage 170 also stores a computer program(s) to cause the ECUs in the controller 180 to perform various operations to be described later. Such a computer program(s) may be provided for the agricultural machine 100 via a storage medium (e.g., a semiconductor memory or an optical disc) or through telecommunication lines (e.g., the Internet). Such a computer program(s) may be marketed as commercial software.

The controller 180 includes a plurality of ECUs. The plurality of ECUs include an ECU 181 for image recognition, an ECU 182 for speed control, an ECU 183 for steering control, an ECU 184 for automatic steering control, an ECU 185 for implement control, an ECU 186 for display control, and an ECU 187 for buzzer control. The ECU 181 for image recognition functions as a processor of the row detection system. The ECU 182 controls the prime mover 102, the transmission 103, and the brakes included in the drive device 140, thus controlling the speed of the agricultural machine 100. The ECU 183 controls the hydraulic device or electric motor included in the steering device 106 based on a measurement value of the steering wheel sensor 150, thus controlling the steering of the agricultural machine 100. The ECU 184 performs computations and controls for achieving auto-steer driving, based on signals which are output from the positioning device 130, the steering wheel sensor 150, and the angle-of-turn sensor 152. During auto-steer driving, the ECU 184 sends the ECU 183 a command to change the steering angle. In response to this command, the ECU 183 controls the steering device 106 to change the steering angle. In order to cause the implement 300 to perform a desired operation, the ECU 185 controls the operation of the linkage device 108. Also, the ECU 185 generates a signal to control the operation of the implement 300, and transmits this signal from the communication IF 190 to the implement 300. The ECU 186 controls displaying on the operational terminal 200. For example, the ECU 186 may cause a display device of the operational terminal 200 to present various indications, e.g., a map of the field, detected crop rows or ridges, the position of the agricultural machine 100 and a target path in the map, pop-up notifications, and setting screens. The ECU 187 controls outputting of alarm sounds by the buzzer 220.

Through the action of these ECUs, the controller 180 is configured or programmed to realize driving via manual steering or automatic steering. During usual auto-steer driving, the controller 180 is configured or programmed to control the drive device 140 based on the position of the agricultural machine 100 as measured or estimated by the positioning device 130 and the target path stored in the storage 170. As a result, the controller 180 is configured or programmed to cause the agricultural machine 100 to travel along the target path. On the other hand, in a row-following control mode where travel is done along the rows, the ECU 181 for image recognition determines from a detected crop row or ridge the edge lines of the crop row or ridge, and generates a target path based on these edge lines. The controller 180 is configured or programmed to perform an operation in accordance with this target path.

The plurality of ECUs included in the controller 180 may communicate with one another according to a vehicle bus standard such as CAN (Controller Area Network). Although the ECUs 181 to 187 are illustrated as individual corresponding blocks in FIG. 29, each of these functions may be implemented by a plurality of ECUs. Alternatively, an onboard computer that integrates the functions of at least some of the ECUs 181 to 187 may be provided. The controller 180 may include ECUs other than the ECUs 181 to 187, and any number of ECUs may be provided in accordance with functionality. Each ECU includes a control circuit including one or more processors.

The communication IF 190 is a circuit that performs communications with the communication IF 390 of the implement 300. The communication IF 190 performs exchanges of signals complying with an ISOBUS standard such as ISOBUS-TIM, for example, between itself and the communication IF 390 of the implement 300. This causes the implement 300 to perform a desired operation, or allows information to be acquired from the implement 300. Moreover, the communication IF 190 can communicate with an external computer via a wired or wireless network. The external computer may be a server computer in a farming support system which centralizes management of information concerning fields by using a cloud, and assists in agriculture by utilizing the data on the cloud, for example.

The operational terminal 200 is a terminal for the operator to perform a manipulation related to the traveling of the agricultural machine 100 and the operation of the implement 300, and may also be referred to as a virtual terminal (VT). The operational terminal 200 may include a display device such as a touch screen panel, and/or one or more buttons. By manipulating the operational terminal 200, the operator can perform various manipulations, such as switching ON/OFF the automatic steering mode, switching ON/OFF the cruise control, setting an initial position of the agricultural machine 100, setting a target path, recording or editing a map, switching between 2WD/4WD, switching ON/OFF the locking differential, and switching ON/OFF the implement 300. At least some of these manipulations can also be realized by manipulating the operation switches 210. Displaying on the operational terminal 200 is controlled by the ECU 186.

The buzzer 220 is an audio output device to present an alarm sound for alerting the operator of an abnormality. For example, during auto-steer driving, the buzzer 220 may present an alarm sound when the agricultural machine 100 has deviated from the target path by a predetermined distance or more. Instead of the buzzer 220, a loudspeaker of the operational terminal 200 may provide a similar function. The buzzer 220 is controlled by the ECU 186.

The drive device 340 in the implement 300 performs a necessary operation for the implement 300 to perform a predetermined task. The drive device 340 includes devices adapted to the intended use of the implement 300, e.g., a pump, a hydraulic device, an electric motor, or a pump. The controller 380 controls the operation of the drive device 340. In response to a signal that is transmitted from the agricultural machine 100 via the communication IF 390, the controller 380 causes the drive device 340 to perform various operations. Moreover, a signal that is in accordance with the state of the implement 300 may be transmitted from the communication IF 390 to the agricultural machine 100.

In the above example embodiments, the agricultural machine 100 may be an unmanned work vehicle which performs self-driving. In that case, component elements which are only required for human driving, e.g., the cabin, the driver's seat, the steering wheel, and the operational terminal, do not need to be provided in the agricultural machine 100. The unmanned work vehicle may perform a similar operation to the operation according to any of the above example embodiments via autonomous driving, or by remote manipulations by an operator.

A system that provides the various functions according to example embodiments can be mounted to an agricultural machine lacking such functions as an add-on. Such a system may be manufactured and sold independently from the agricultural machine. A computer program for use in such a system may also be manufactured and sold independently from the agricultural machine. The computer program may be provided in a form stored in a computer-readable, non-transitory storage medium, for example. The computer program may also be provided through downloading via telecommunication lines (e.g., the Internet).

In the above example embodiments, the agricultural machine 100 is a work vehicle for agricultural purposes; however, the agricultural machine 100 is not limited to work vehicles. The agricultural machine 100 may be an unmanned aerial vehicle (e.g., a drone) for agricultural purposes. The row detection system according to an example embodiment of the present disclosure may be mounted on such an unmanned aerial vehicle to detect a row region such as a crop row or ridge on the ground surface. Such an unmanned aerial vehicle can perform agricultural work such as spraying a chemical agent or a fertilizer, while flying along a detected row region.

The techniques and example embodiments according to the present disclosure can be applied to agricultural machines, such as vehicles for crop management, vegetable transplanters, tractors, or agricultural drones, for example.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A row detection system comprising:
   a first imaging device to be mounted on an agricultural machine including a plurality of wheels including a pair of front wheels and a pair of rear wheels, the first imaging device being operable to image a ground surface and generate a first image concerning a first region of the ground surface;
   a second imaging device to be mounted on the agricultural machine and operable to image the ground surface and generate a second image concerning a second region of the ground surface, the second region being shifted rearward from the first region; and
   a processor configured or programmed to perform image processing for the first image and the second image; wherein
   the second imaging device is located so that at least a portion of each front wheel and at least a portion of each rear wheel are included in the second image; and
   the processor is configured or programmed to:
   convert the first image into a first plan view image as viewed from above the ground surface;
   convert the second image into a second plan view image as viewed from above the ground surface; and
   select a region of interest from the first plan view image based on a position of each front wheel and a position of each rear wheel in the second plan view image, and perform a row detection process targeted at the region of interest.

2. The row detection system of claim 1, wherein the processor is configured or programmed to:
   detect regions corresponding to the pair of front wheels and regions corresponding to the pair of rear wheels in the second plan view image; and
   determine a width of the region of interest based on the regions corresponding to the pair of front wheels and the regions corresponding to the pair of rear wheels.

3. The row detection system of claim 2, wherein the region of interest is a rectangular or substantially rectangular region extending along a vertical direction in a center of the first plan view image and having the width determined by the processor.

4. The row detection system of claim 2, wherein
   the first image and the second image are color images; and
   the processor is configured or programmed to determine the regions corresponding to the pair of front wheels and the regions corresponding to the pair of rear wheels in the second plan view image based on color information of the pair of front wheels and the pair of rear wheels.

5. The row detection system of claim 4, wherein the processor is configured or programmed to:
   extract a pair of front-wheel reference points from the regions corresponding to the pair of front wheels;
   extract a pair of rear-wheel reference points from the regions corresponding to the pair of rear wheels; and
   determine the width of the region of interest based on one or both of the pair of front-wheel reference points and the pair of rear-wheel reference points.

6. The row detection system of claim 5, wherein the processor is configured or programmed to:
   determine a vertical reference line that divides the second plan view image into a left portion and a right portion;
   select as the pair of front-wheel reference points a pair of pixels that are closest to the vertical reference line from the regions corresponding to the pair of front wheels;
   select as the pair of rear-wheel reference points a pair of pixels that are closest to the vertical reference line from the regions corresponding to the pair of rear wheels; and
   determine the width of the region of interest based on one of a front wheel interval defined by a distance between the pair of front-wheel reference points and a rear wheel interval defined by a distance between the pair of rear-wheel reference points.

7. The row detection system of claim 6, wherein the processor is configured or programmed to determine the width of the region of interest based on an interval that is not a smaller one of the front wheel interval and the rear wheel interval.

8. The row detection system of claim 6, wherein the processor is configured or programmed to use as the width of the region of interest a value obtained by multiplying one of the front wheel interval and the rear wheel interval with a numerical value of not less than about 0.9 and not more than about 2.0.

9. The row detection system of claim 6, wherein the processor is configured or programmed to:
   determine a horizontal reference line that is orthogonal to the vertical reference line, the horizontal reference line dividing each of the left portion and the right portion of the second plan view image into an upper portion and a lower portion, such that the regions corresponding to the pair of front wheels are included in the upper portion and that the regions corresponding to the pair of rear wheels are included in the lower portion;

detect edges in the second plan view image by an edge detection technique;

determine overlapping portions between the edges and the regions corresponding to the pair of front wheels and the regions corresponding to the pair of rear wheels in the second plan view image; and in each of four portions divided by the vertical reference line and the horizontal reference line, select as the front-wheel reference points and the rear-wheel reference points pixels in the overlapping portions that are located closest to the vertical reference line.

10. The row detection system of claim 1, wherein
the first image and the second image are color images; and
the processor is configured or programmed to:
generate from the region of interest of the first plan view image a first plan view enhanced image in which a color of a crop row is enhanced;
generate from the first plan view enhanced image a first plan view binarized image that is classified into pixels of which a color index value for the crop row is equal to or greater than a threshold and pixels of which the index value is below the threshold; and
detect the crop row on the ground surface based on the first plan view binarized image.

11. The row detection system of claim 10, wherein the processor is configured or programmed to:
extend the region of interest of the first plan view image into the second plan view image;
generate from the region of interest of the second plan view image a second plan view enhanced image in which a color of a crop row is enhanced;
generate from the second plan view enhanced image a second plan view binarized image that is classified into pixels of which a color index value for the crop row is equal to or greater than a threshold and pixels of which the index value is below the threshold; and
detect the crop row on the ground surface based on the first plan view binarized image and the second plan view binarized image.

12. The row detection system of claim 1, wherein
the first imaging device is mounted obliquely forward and downward; and
the second imaging device is mounted downward.

13. The row detection system of claim 1, wherein,
the agricultural machine is a work vehicle; and
the second imaging device is mounted under the work vehicle.

14. The row detection system of claim 1, wherein the processor is configured or programmed to generate a target path based on a position of a crop row or a ridge determined by the row detection process.

15. An agricultural machine comprising:
the row detection system according to claim 1; and
an automatic steering device to control a traveling direction of the agricultural machine based on a position of a crop row or a ridge detected by the row detection system.

16. The agricultural machine of claim 15, further comprising traveling equipment including a wheel responsible for steering; wherein
the automatic steering device is operable to control a steering angle of the wheel responsible for steering based on the position of the crop row or the ridge detected by the row detection system.

* * * * *